United States Patent
Lord et al.

(10) Patent No.: US 11,184,766 B1
(45) Date of Patent: Nov. 23, 2021

(54) SYSTEMS AND METHODS FOR CONTINUOUS AUTHENTICATION, IDENTITY ASSURANCE AND ACCESS CONTROL

(71) Applicant: Locurity Inc., Herndon, VA (US)

(72) Inventors: Christopher Charles Lord, Natick, MA (US); Joshua Andrew Hartley, Malden, MA (US); Shrikant N. Palaskar, Cambridge, MA (US)

(73) Assignee: Locurity Inc., Herndon, VA (US)

( * ) Notice: Subject to any disclaimer, the term of this patent is extended or adjusted under 35 U.S.C. 154(b) by 0 days.

(21) Appl. No.: 15/683,497

(22) Filed: Aug. 22, 2017

Related U.S. Application Data

(60) Provisional application No. 62/384,538, filed on Sep. 7, 2016.

(51) Int. Cl.
*H04W 12/06* (2021.01)
*H04L 29/06* (2006.01)
(Continued)

(52) U.S. Cl.
CPC .......... *H04W 12/06* (2013.01); *G06K 9/0002* (2013.01); *G06K 9/00087* (2013.01);
(Continued)

(58) Field of Classification Search
CPC ....... H04W 12/06; H04W 12/08; H04W 4/70; H04W 12/12; H04W 8/22; H04W 4/029;
(Continued)

(56) References Cited

U.S. PATENT DOCUMENTS

| 7,088,220 B2 * | 8/2006 | Kotzin | G07C 9/00142 340/5.82 |
| 7,673,145 B2 * | 3/2010 | Hatano | G06K 9/00067 713/182 |

(Continued)

FOREIGN PATENT DOCUMENTS

ES      2360909 T3 * 2/2008 ............ H04W 64/00

OTHER PUBLICATIONS

SurroundSense: Mobile Phone Localization via Ambience Fingerprinting Martin Azizyan—martin.azizyan@duke.edu Sep. 20-25, 2009, Beijing, China pp. 12 (Year: 2009).*

(Continued)

*Primary Examiner* — Samson B Lemma
*Assistant Examiner* — Ali H. Cheema
(74) *Attorney, Agent, or Firm* — Wolf, Greenfield & Sacks, P.C.

(57) ABSTRACT

According to one embodiment, the system maintains and enforces assertions about a user's intent and identity at a point of access (e.g., a computer system being used to access a service, system, cloud, etc.). In one example, the system includes lightweight browser components and mobile and/or desktop agents that communicate in the background with a cloud-based authentication service. The system integrates seamlessly with enterprise applications, cloud services, multi-factor authentication solutions and existing identity management solutions. In one example, the system includes protocols, application programming interfaces, etc. that facilitate integration with standards such as Fast Identity Online ("FIDO") Universal Authentication and OpenID Connect. In one example, the system includes protocols, application programming interfaces, etc. that facilitate integration with existing widely adopted SMS/Phone call or One Time Passcode (OTP) based multi-factor solutions so such
(Continued)

system can be integrated with existing enterprise infrastructure with minimal efforts.

21 Claims, 7 Drawing Sheets

(51) Int. Cl.
*G06K 9/00* (2006.01)
*G06K 9/66* (2006.01)
*H04W 12/08* (2021.01)
*G06N 5/04* (2006.01)

(52) U.S. Cl.
CPC .......... *G06K 9/00335* (2013.01); *G06N 5/04* (2013.01); *H04L 63/0861* (2013.01); *H04L 63/107* (2013.01); *H04W 12/08* (2013.01); *G06K 9/66* (2013.01)

(58) Field of Classification Search
CPC ............ G06K 9/0002; G06K 9/00087; G06K 9/00335; G06K 9/66; G06K 9/00067; G06K 9/00; G06N 5/04; H04L 63/0861; H04L 63/107; H04L 63/10; H04L 63/20; H04L 63/083; G06Q 30/0251; G06Q 30/02; G07C 9/00142; G06F 3/167; G06F 16/634; G06F 16/489; G06F 21/31; G06F 21/32; G06F 21/316; G06F 21/40; H04N 5/60
USPC ....... 726/3, 6, 7, 19; 715/768; 713/182, 168; 705/18, 7.34
See application file for complete search history.

(56) References Cited

U.S. PATENT DOCUMENTS

| | | | | |
|---|---|---|---|---|
| 8,955,069 | B1* | 2/2015 | Dotan | H04L 63/0861 726/6 |
| 8,977,974 | B2* | 3/2015 | Kraut | H04N 5/60 715/768 |
| 9,332,434 | B1 | 5/2016 | Dotan et al. | |
| 9,367,613 | B1* | 6/2016 | Tome | G06F 16/634 |
| 9,392,460 | B1* | 7/2016 | Blake | H04W 4/029 |
| 9,449,160 | B1* | 9/2016 | Czeskis | G06F 3/167 |
| 9,477,709 | B2* | 10/2016 | Sharifi | G06F 16/489 |
| 9,585,006 | B2* | 2/2017 | Qian | H04W 8/22 |
| 9,781,575 | B1* | 10/2017 | Wan | H04W 4/70 |
| 9,967,750 | B1* | 5/2018 | Fernandez | H04W 12/12 |
| 9,996,684 | B2 | 6/2018 | Hoyos et al. | |
| 10,408,623 | B2* | 9/2019 | Brush | G01C 21/20 |
| 2012/0192252 | A1 | 7/2012 | Kuo et al. | |
| 2012/0245978 | A1* | 9/2012 | Jain | G06Q 30/02 705/7.34 |
| 2013/0055348 | A1* | 2/2013 | Strauss | G06F 21/31 726/3 |
| 2013/0202128 | A1* | 8/2013 | Jain | G06Q 30/0201 381/76 |
| 2013/0204813 | A1* | 8/2013 | Master | G06N 20/00 706/12 |
| 2014/0007225 | A1* | 1/2014 | Gay | G06F 21/40 726/19 |
| 2014/0250523 | A1* | 9/2014 | Savvides | G06F 21/32 726/19 |
| 2014/0280569 | A1* | 9/2014 | Harris | H04W 4/185 709/204 |
| 2014/0316841 | A1* | 10/2014 | Kilby | G06F 16/51 705/7.26 |
| 2015/0242605 | A1* | 8/2015 | Du | G06F 21/31 726/7 |
| 2016/0063503 | A1* | 3/2016 | Kobres | G06F 21/316 705/18 |
| 2016/0141869 | A1* | 5/2016 | Byron | H02J 3/00 700/291 |
| 2016/0182503 | A1* | 6/2016 | Cheng | H04L 63/12 726/7 |
| 2016/0197962 | A1* | 7/2016 | Winn | H04L 63/20 713/168 |
| 2016/0205094 | A1 | 7/2016 | Harthattu et al. | |
| 2016/0227411 | A1* | 8/2016 | Lundblade | H04W 12/08 |
| 2016/0239649 | A1* | 8/2016 | Zhao | G06F 21/316 |
| 2016/0286394 | A1* | 9/2016 | Iyer | H04W 12/06 |
| 2016/0300049 | A1* | 10/2016 | Guedalia | G06F 21/316 |
| 2016/0359838 | A1* | 12/2016 | Dasgupta | H04L 63/083 |
| 2017/0243246 | A1* | 8/2017 | Rodriguez | G06Q 30/0251 |
| 2019/0319965 | A1 | 10/2019 | Brown et al. | |

OTHER PUBLICATIONS

Catch You as I Can: Indoor Localization via Ambient Sound Signature and Human Behavior Junzhao Du, Wenjing Chen, Yuewei Liu, Yawen Gu, and Hui Liu Hindawi Publishing Corporation vol. 2013, Article ID 434301, 16 pages (Year: 2013).*

A privacy-aware continuous authentication scheme for proximity-based access control by Isaac Agudo, Ruben Rios, Javier Lopez (Network Information and Computer Security (NICS) Lab, University of Malaga, Spain) pp. 10; (Year: 2013).*

Approaches and Issues in Location-Aware Continuous Authentication by Stan Kurkovskyand Ewa Syta (Department of Computer Science, Central Connecticut State University, USA) pp. 5; (Year: 2010).*

Continuous User Authentication on Mobile Devices by Vishal M. Patel, Rama Chellappa, Deepak Chandra, and Brandon Barbello pp. 13; Jul. 1, 2016.*

Addressing Insider Threat using "Where You Are" as Fourth Factor Authentication by Sung Choi and David Zage (Sandia National Laboratories, Albuquerque, NM, USA 87185-9300) pp. 7; IEEE (Year: 2012).*

Fingerprinting Your Files by Simson Garfinkel pp. 13; Aug. 4, 2004.*

Calculating the fingerprint of a file by NetApp, Inc. (Part No. 215-07975_A0) pp. 1; May 2013.*

* cited by examiner

SYSTEMS AND METHODS FOR CONTINUOUS AUTHENTICATION, IDENTITY ASSURANCE AND ACCESS CONTROL

RELATED APPLICATIONS

This application claims the benefit under 35 U.S.C. § 119 of U.S. Application Ser. No. 62/384,538, entitled "SYSTEMS AND METHODS FOR AMBIENT AUTHENTICATION, IDENTITY ASSURANCE AND ACCESS CONTROL" filed on Sep. 7, 2016, which is herein incorporated by reference in its entirety.

BACKGROUND

Conventional approaches that implement single factor authentication using usernames and passwords are clearly insufficient to safeguard access to protected services. Once integrated into cloud systems and services, the inadequacy of single factor authentication becomes even more exacerbated.

Multifactor authentication is available in some conventional systems and multifactor authentication can increase the degree of confidence in a user's identity by distributing the burden of proof across distinct knowledge (something you know), possession (something you have) and inherence (something you are) factors, each of which must be acquired by an adversary seeking access.

Incorporating multiple factor authentication can be costly and places new burdens on users. For example, hardware security tokens can cost between $20 and $60 per user, smart card solutions around $50 per user, and biometric solutions over $100 per user. Users must remember to carry these tokens and interact with them each time they require access to satisfy the additional verification factors: a user might be required to insert a smartcard and enter a PIN, or have a fingerprint or facial image scanned, or enter a generated one-time passcode.

SUMMARY

It is realized that even conventional multifactor authentication can be circumvented. For example, PINs can be guessed or revealed; fingerprints and facial images faked; and access tokens lost, copied or stolen. According to one aspect, there remains a need for a way to provide a high level of user identity assurance without additional demands on users. According to one embodiment, the ubiquity of modern mobile smartphones with their array of sensors, cryptographically secure stores and trusted execution environments provides a platform to augment conventional security verification and/or authentication.

Stated broadly, various aspects of the disclosure implement ambient authentication to provide the high level of user identity assurance needed, improve security over conventional approaches, and at the same time eliminate the burden associated with many multifactor authentication systems. According to one embodiment, ambient authentication systems solve one of the biggest problems in cybersecurity and the root of most data breaches—the misuse of credentials—by bringing secure identity and authentication to the cloud and enterprise with no tokens, no passwords, and no hassle.

A study by Rapid7 found that 90% of organizations worried about compromised credentials, and 60% say they cannot detect—much less prevent—these types of attacks. With ambient authentication systems corporations or any service host can detect compromised credentials and associated attacks. For example, the ambient authentication system implements ambient and artificial intelligence to continuously and transparently identify and authenticate users with mobile devices. According to one embodiment, access is based on privacy-preserving fingerprints generated based on information from any one or more of the sensed ambient background (e.g., sound, Wi-Fi, GPS, cellular), sensed active signaling (e.g. sound, NFC, Bluetooth), and predictive models of user behavior. The system provides higher degrees of security and effectiveness over conventional approaches because, for example, the characteristics of an adversary differ from a proper user—and the system builds fingerprints that identify legitimate use or users. Adversaries are identified by access unsupported by required fingerprints.

Furthermore with increasing cloud adoption and mobility initiatives, existing authentication systems can not restrict/control access based on 'where' the access is originating from—such as from a specific geographical area. Such limitations make entire enterprise digital infrastructure vulnerable to attacks that originate from the entire world once the employee or legitimate user's access credentials and/or multi factor systems are compromised by the attacker, even when such access to sensitive information is needed only from certain geolocations where the employees are based. In addition, the existing technology for attributing geolocation of access is purely based on Internet Protocol (IP) address information, which often gets translated into geolocation. Such IP to geolocation translation is very easy to spoof using various mechanisms such as Virtual Private Network (VPN), the known Onion Router (TOR), proxy servers, etc. These known circumvention approaches thus prevent implementation of any such access control mechanism that uses geolocation of user as a determining factor to limit access to certain geolocations to increase enterprise security posture. Various embodiments of the proposed system overcome these existing issues using the ambient fingerprints that consist of various geolocation specific out of band parameters. The fingerprints can be used to limit access only to whitelisted geographical areas or geo-fences within which the legitimate users'/employees' routines access sensitive information.

According to another embodiment, the system maintains and enforces assertions about a user's intent and identity at a point of access (e.g., a computer system being used to access a service, system, cloud, etc.). In one example, the system includes lightweight browser components and mobile and/or desktop agents that communicate in the background with a cloud-based authentication service. The system integrates seamlessly with enterprise applications, cloud services, multi-factor authentication solutions and existing identity management solutions. In one example, the system includes protocols, application programming interfaces, etc. that facilitate integration with standards such as Fast Identity Online ("FIDO") Universal Authentication and OpenID Connect. In one example, the system includes protocols, application programming interfaces, etc. that facilitate integration with existing widely adopted SMS/Phone call or One Time Passcode (OTP) based multi-factor solutions so such system can be integrated with existing enterprise infrastructure with minimal efforts.

According to one aspect a system for enhanced authentication is provided. The system comprises an authentication service, executed by at least one processor, in communication with at least one of a point of access, a point of presence, or a point of service, wherein the authentication service is configured to manage access between an end user and the point of service; wherein responsive to an access request for the point of service, the authentication service is configured to: authenticate a source of the access request for the point of service; authenticate a location of the point of presence; determine a proximity measure between the point of access and the point of presence associated with the end user and the access request; and continuously confirm identity of the end user during an authentication session between the end user and the point of service.

According to one embodiment, the authentication service is configured to cryptographically identify an agent process executing on the point of service to authenticate the source of the access request. According to one embodiment, the authentication service is configured to generate an ambient fingerprint from information captured through the point of presence and determine that the ambient fingerprint is associated with an approved location. According to one embodiment, the authentication service is configured to co-locate the point of presence and the point of access to determine they are proximate or in an approved location pairing.

According to one embodiment, the authentication service is configured to analyze any one or more of: patterns of movement, patterns of activity, and authentication history to continuously confirm identity of the end user. According to one embodiment, the authentication service is configured to: detect an anomaly in one or more of: the patterns of movement, the patterns of activity, or the authentication history; and terminate the authentication session responsive to detecting the anomaly.

According to one embodiment, the authentication service is configured to trigger generation of ambience information from the point of presence. According to one embodiment, the authentication service is configured to generate a device fingerprint from information captured through the point of presence and verify that the device fingerprint corresponds to an approved device. According to one embodiment, the authentication service is in communication with one or more hardware devices associated with the point of access and the authentication service is configured to further co-locate the point of presence and the point of access using ambience information received from the one or more hardware devices. According to one embodiment, the authentication service is configured to compare ambient fingerprint information associated with the point of access to ambient fingerprint information associated with the point of presence to determine the proximity measure between the point of access and the point of presence.

According to one aspect, a computer-implemented method of enhanced authentication is provided. The method comprises authenticating, by a computer system, a source of the access request for the point of service; authenticating, by the computer system, a location of a point of presence; determining, by the computer system, a proximity measure between a point of access and the point of presence associated with the end user and the access request; and continuously confirming identity, by the computer system, of the end user during an authentication session between the end user and the point of service.

According to one embodiment, the act of authenticating the source of the access request includes cryptographically identifying an agent process executing on the point of service. According to one embodiment, the method further comprises generating an ambient fingerprint from information captured through the point of presence and determining that the ambient fingerprint is associated with an approved location. According to one embodiment, the method further comprises co-locating the point of presence and the point of access to determine they are proximate or in an approved location pairing.

According to one embodiment, the act of continuously confirming the identity of the end user includes analyzing any one or more of: patterns of movement, patterns of activity, and authentication history. According to one embodiment, the method further comprises acts of: detecting an anomaly in one or more of: the patterns of movement, the patterns of activity, or the authentication history; and terminating the authentication session responsive to detecting the anomaly.

According to one embodiment, the method further comprises triggering generation of ambience information from the point of presence. According to one embodiment, the method further comprises generating a device fingerprint from information captured through the point of presence and verifying that the device fingerprint corresponds to an approved device. According to one embodiment, the method further comprises communicating with one or more hardware devices associated with the point of access, and co-locating the point of presence and the point of access using ambience information received from the one or more hardware devices. According to one embodiment, the act of determining the proximity measure between the point of access and the point of presence includes: comparing ambient fingerprint information associated with the point of access to ambient fingerprint information associated with the point of presence.

According to one aspect at least one non-transitory computer-readable storage medium containing processor-executable instructions is provided. The method comprises managing access between an end user and the point of service; executing, responsive to an access request for the point of service, acts of: authenticating a source of the access request for the point of service; authenticating a location of the point of presence; determining a proximity measure between a point of access and the point of presence associated with the end user and the access request; and continuously confirming identity of the end user during an authentication session between the end user and the point of service.

According to one aspect a system for enhanced authentication is provided. The system comprises: an authentication service, executed by at least one processor, in communication with at least one of a point of access, a point of presence, or a point of service, wherein the authentication service is configured to manage access between an end user and the point of service; responsive to an access request for the point of service, the authentication service is configured to: receive ambient environment information from a user device associated with the end user; compare an ambient fingerprint for an authorized user location to the ambient environment information; and responsive to matching at least a portion of the ambient fingerprint to the ambient environment information permit the access request for the point of service.

According to one embodiment, the system is configured to generate the ambient finger print for the authorized location based on sensor readings taken at or proximate to the authorized location. According to one embodiment, the system is configured to generate the ambient fingerprint based on information from any one or more of the sensed ambient environment factors including one or more of sound, Wi-Fi signals, Bluetooth signals, GPS data, cellular signals, temperature, lighting, humidity. According to one embodiment, the system is configured to incorporate active signaling into predictive models of user behavior.

According to one embodiment, the authentication service is configured to continuously monitor the ambient environment information responsive to permitting the access request for the point of service. According to one embodiment, the authentication service is configured to: detect that the ambient environment information does not match the ambient fingerprint for the authorized user location; and terminate access to the point of service responsive to the detecting. According to one embodiment, the authentication service is configured to: determine that the ambient information received does not match the at least a portion of the ambient finger print; and request confirmation that, during future verification, the authentication service compares future ambient environment information received from the user device to a second user location indicated by the ambient environment information.

According to one embodiment, the authentication service is configured to: receive biometric information from the user device; and verify that the end user is conforming to access requirements based at least on the received biometric information. According to one embodiment, the authentication service is configured to: track movement of the end user based on the received biometric information; and terminate access to the point of service responsive to identifying movement of the user that deviates from the access requirements. According to one embodiment, the authentication service is configured to: continuously monitor activity of the end user interacting with an application provided by the point of service; and terminate access to the point of service responsive to identifying activity that deviates from access requirements of the point of service.

According to one aspect a computer-implemented method of enhanced authentication is provided. The method comprises: receiving, by a computer system, ambient environment information from a user device associated with the end user; comparing, by the computer system, an ambient fingerprint for an authorized user location to the ambient environment information; and permitting, by the computer system, the access request for the point of service responsive to matching at least a portion of the ambient fingerprint to the ambient environment information.

According to another aspect, a computer-implemented method of enhanced authentication is provider. The method comprises receiving, by a computer system, ambient environment information from a user device associated with the end user; comparing, by the computer system, an ambient fingerprint for an authorized user location to the ambient environment information; and permitting, by the computer system, the access request for the point of service responsive to matching at least a portion of the ambient fingerprint to the ambient environment information. According to one embodiment, the method further comprises generating the ambient finger print for the authorized location based on sensor readings taken at or proximate to the authorized location. According to one embodiment, the method further comprises generating the ambient fingerprint based on information from any one or more of the sensed ambient environment factors including one or more of sound, Wi-Fi signals, Bluetooth signals, GPS data, cellular signals, temperature, lighting, humidity). According to one embodiment, the method further comprises incorporating active signaling into predictive models of user behavior.

According to one embodiment, the method further comprises continuously monitoring the ambient environment information responsive to permitting the access request for the point of service. According to one embodiment, the method further comprises detecting that the ambient environment information does not match the ambient fingerprint for the authorized user location; and terminating access to the point of service responsive to the detecting. According to one embodiment, the method further comprises determining that the ambient information received does not match the at least a portion of the ambient finger print; and requesting confirmation that, during future verification, the authentication service compares future ambient environment information received from the user device to a second user location currently indicated by the ambient environment information.

According to one embodiment, the method further comprises receiving biometric information from the user device; and verifying that the end user is conforming to access requirements based at least on the received biometric information. According to one embodiment, the method further comprises tracking movement of the end user based on the received biometric information; and terminating access to the point of service responsive to identifying movement of the user that deviates from the access requirements. According to one embodiment, the method further comprises continuously monitoring activity of the end user interacting with an application provided by the point of service; and terminating access to the point of service responsive to identifying activity that deviates from access requirements of the point of service.

According to one aspect, at least one non-transitory computer-readable storage medium containing processor-executable instructions is provided. The method comprises receiving ambient environment information from a user device associated with the end user; comparing an ambient fingerprint for an authorized user location to the ambient environment information; and permitting the access request for the point of service responsive to matching at least a portion of the ambient fingerprint to the ambient environment information.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
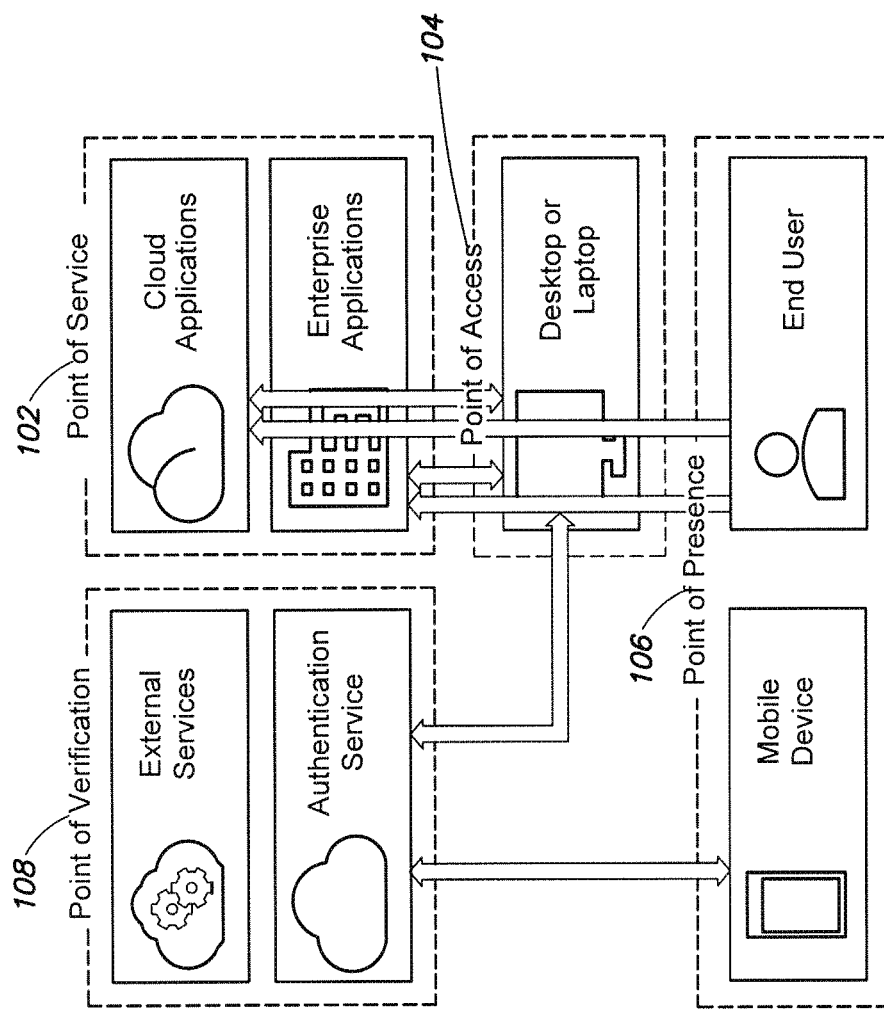
FIG. 1 is block diagram of an example system, according to one embodiment.

According to one aspect, an ambient authentication system is configured to use behavioral analysis and ambient intelligence, for example, based on a user's mobile device to authoritatively identify a user and transparently authenticate that user. In further embodiments, identity and authentication claims are continuously verified, as is the user's intentional access to the authenticated service. Authentication can be based on a novel approach of incorporating digital and environmental ambience that surrounds registered devices involved in accessing an authenticated service: the mobile device at the point of presence and the desktop/laptop or other intermediary device used as a point of access to the service.

Ambient factors can include ubiquitous radio signals such as Wi-Fi, Bluetooth, GPS, computer network information including networked device information and cellular as well as environmental readings such as pressure, humidity, gravity, sound, and light. Various elements or all of the ambience information can be encoded in an "ambient fingerprint" that represents a place far more specifically than conventional location information. According to one embodiment, a user's access can then be verified by the system if the ambient fingerprint at the point of presence corresponds (e.g., within a pre-defined threshold) with the ambient fingerprint associated with the point of access, and that the device fingerprints correspond to those previously registered with the authentication service. In further embodiments, the out-of-band nature of ambient factors makes it difficult for an adversary to spoof and therefore offers a high degree of assurance that a user's access is intentional and authorized.

According to one embodiment, the system is configured to enhance and augment the passive readings of the ambient background, by triggering active signaling to generate additional ambience. In one example with active signaling, one or more devices involved in an authentication generate specifically encoded signals that can be detected between or by two proximate devices. The triggered signaling can include, for example, ultrasonic sound, Wi-Fi Direct, Bluetooth, and NFC. According to one embodiment, the generation and detection of these signals become part of the ambient fingerprint and provide high-fidelity assurance of colocation.

According to one embodiment, such proposed system that bolsters conventional location information with various out-of-band ambient factors (as discussed herein), can be effectively used to control access to enterprise digital infrastructure based on generated ambient fingerprints at the time of access. This approach effectively eliminates the drawbacks of existing methods to determine geolocation of access based on Internet Protocol (IP) address information and thus prevents unauthorized access even when the access credentials and/or multi factor authentication systems may have been compromised. Existing methodologies to control access based on multi factors in addition to single factor (such as password) allow 'anytime anywhere' access even when such 'anywhere' access is not intended. Anywhere access exposes an enterprise digital infrastructure to various remote cyber-attacks. Predominantly, these attacks originate in foreign countries, thus the use of ambient fingerprints can be particularly suited to thwarting these attacks, and even when the attacker attempts to spoof an appropriate location.

According to some embodiments, the systems makes it harder for the cyber attackers to remotely compromise enterprise infrastructure by defining a 'geo-fenced' or whitelisted geolocation. The geo-fencing can be executed by the system, first in order to generate an ambient fingerprint (consisting of multitude of ambient factors) that matches previously computed fingerprints for the legitimate user to satisfy an access requirement. And second, the cyber attacker must also then compromise the corresponding user's access credentials and gain physical access to his/her access device to successfully gain unauthorized access. Thus, implementation of ambient fingerprinting and location aware access raises the odds against such compromise significantly higher.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Examples of the methods, devices, and systems discussed herein can be extended beyond authentication and access control to include various other applications including but not limited to financial transaction validation (online as well as offline), restricting access to sensitive patient data (sensitive patient information cannot be accessed outside of the facility identified, for example, by an ambient fingerprint, etc.), restricting online digital media access where distribution rights are geographically constrained (such as Spotify, Netflix, etc.), restricting online access to gaming/gambling sites based on applicable local laws where user resides, and/or restricting access to Internet of Things (IoT) devices, capabilities and sensor data, etc.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof, is meant to encompass the items listed thereafter and equivalents thereof, as well as additional items. References to "or" may be construed as inclusive so that any terms described using "or" may indicate any of a single element, combinations of single elements, more than one, and all of the described terms.

FIG. 1 is a block diagram of an example environment in which the ambient authentication system can be implemented. At 102, the point of service illustrates the target application or service, either in the cloud or in the enterprise, being protected. At 104, the point of access illustrates the computing system (e.g., desktop, laptop, mobile device, PDA, etc.) used to access a cloud or enterprise application. At 106, the point of presence illustrates the location of the user and their device (e.g., mobile device). In the most common access cases point of presence is co-located with the point of access. An exception case is when a user is using an intermediate system (such as a home system) to reach the point of access system (a work system). Regardless of scenario, the ambient authentication system can provide enhanced security.

At 108, the point of verification illustrates where authentication takes place. And according to one embodiment, the system is configured such that the point of verification is the only place where private keys for relying-parties exist. Although the authentication service is illustrated in block 108 point of verification, the system elements that provide verification and the external service being accessed can also be remote from each other, they can also be on the same system. The point of verification can also include supporting services for cloud messaging and storage. In some embodiments, access to the point of verification is required from the point of access and the point of presence (in various embodiments, it is not necessary that the point of service be able to directly communicate).

Some additional enhancements include hardware device(s) that act as ambience generators. The ambience generators can be configured to emit continuously encoded and unique signaling (e.g., imperceptible to humans but easily detected by most devices). When installed around an office location, for example, the ambience generators can provide extremely precise measurements of colocation. In some embodiments, the ambience generators can be configured to supplement situations where devices might not have adequate sensors or the ambient background is not sufficiently distinct or stable. Ambient verification can augment any existing system. For example, ambient verification can be integrated into existing systems as a cloud based service, for example, establishing identity and authenticity.

According to one embodiment, identity proofing and verification can be performed in a cloud-hosted service based on, for example, the continuous analysis of biometric and behavioral readings from a user's mobile device. Identity proofing and verification can also be configured to include any one or more of: patterns of movement (e.g., movement within a location, and more specific motion, including gait, pace, average number of steps, or other movement pattern), patterns of activity (application use, network and service use, screen and keyboard interactions, etc.), and ambient fingerprint history. According to one embodiment, the system is configured to determine if these patterns are (and continue to be) consistent with the past in order for the user's identity to be established for authentication. If at any point after the user is authenticated, the system detects an anomaly in biometric or behavioral readings, ambient information, or ambient fingerprints no longer match, the system is configured to terminate the user's access to the authenticated service. Thus, various embodiments significantly improve over such conventional authentication mechanisms that only perform identity proofing and verification once.

Figure 2A:
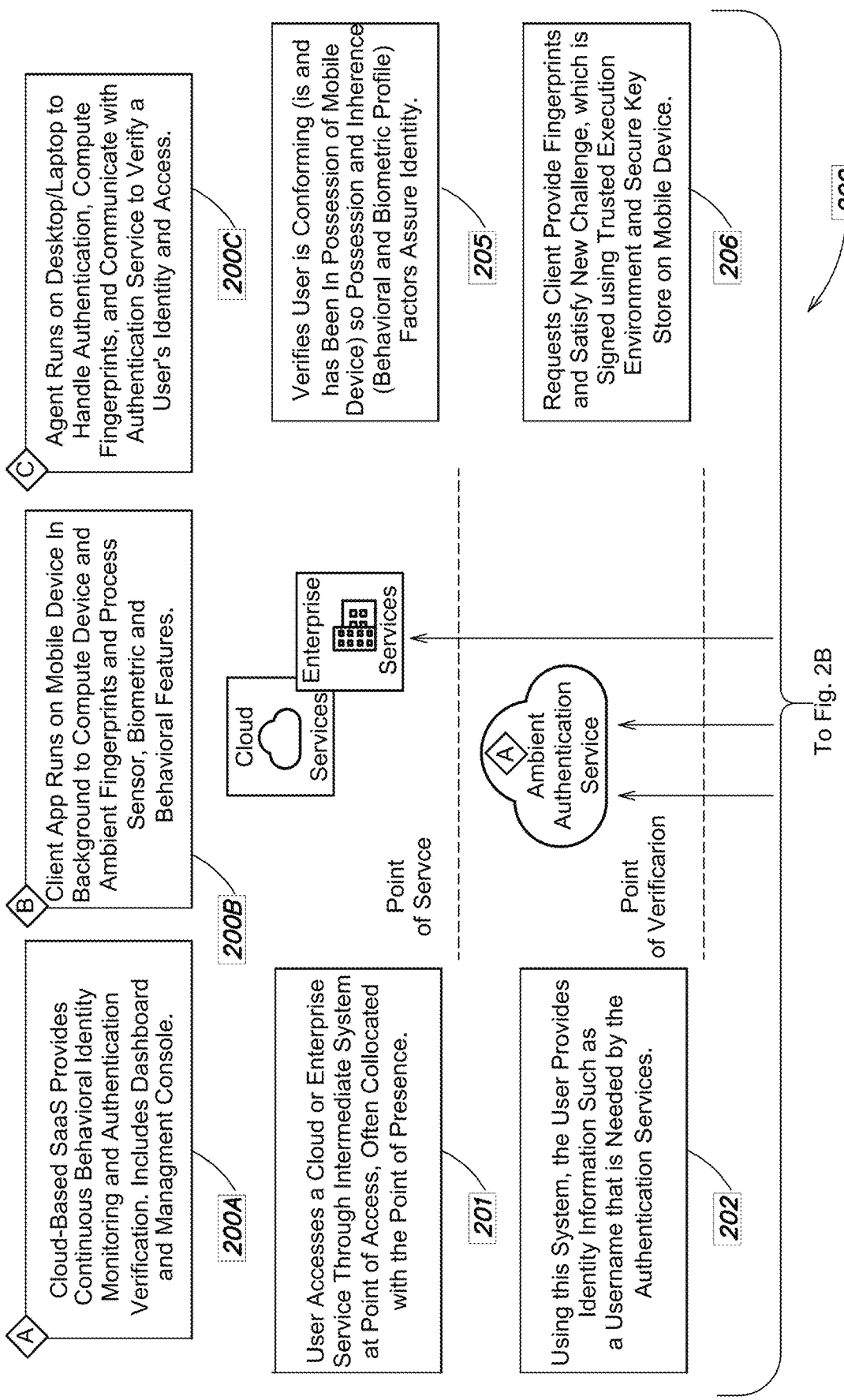
FIGS. 2A-B are block diagrams of example system components with example process flow, according to one embodiment.
Figure 2B:
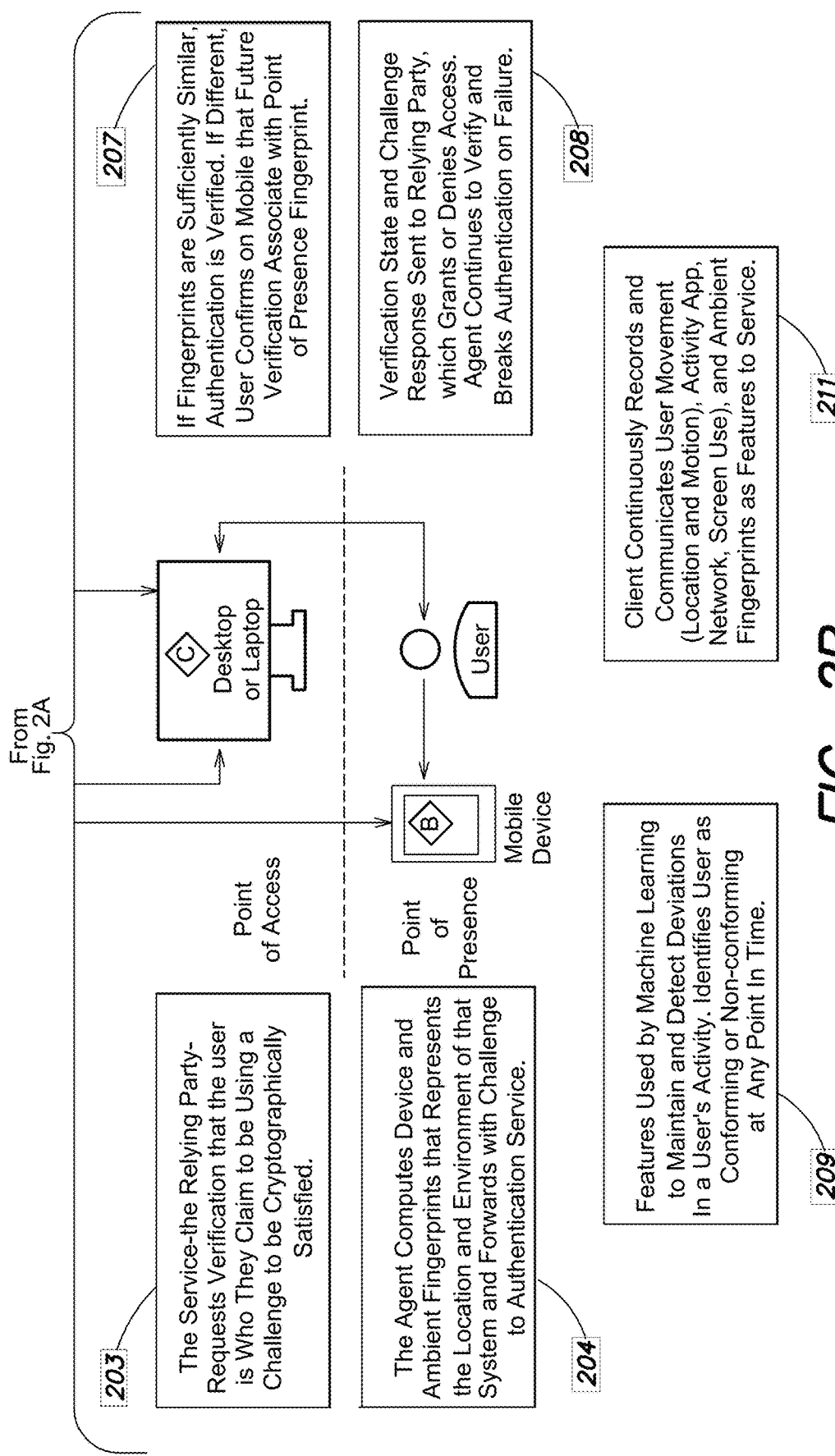

FIG. 2 is a block diagram of an ambient authentication system environment 200 and example authentication and identity process flows that can be executed by the system. In one embodiment, the ambient authentication system consists of the following architectural components: an ambient authentication service 200A, a point of presence device (e.g., a mobile device) 200B, and a point of access (e.g., a laptop or desktop) 200C in FIG. 2.

In some embodiments, the ambient authentication service 200A can comprise a cloud based software as a service (SaaS). The ambient authentication service 200A can be configured to provide continuous behavioral identify monitoring and authentication information. In some embodiments, the ambient authentication service 200A may include a dashboard and management console for accessing and managing the ambient authentication service 200A.

In some embodiments, a point of presence (e.g., a mobile device) 200B can be configured to include a client application that runs on the mobile device 200B in the background. The client application can be configured to compute device and ambient fingerprints. Additionally, the client application can be configured to process sensor, biometric, and behavioral features.

In some embodiments, a point of access (e.g., laptop, desktop, or mobile device) 200C can be configured to include an agent that runs on the device 200C to handle authentication and compute fingerprints. The point of access 200C can further be configured to communicate with ambient authentication service 200A to verify a user's identity and access. In some embodiments, the point of presence 200B can also be configured include an agent that handles authentication and compute fingerprints. The point of presence can further be configured to communicate with ambient authentication service 200A to verify a user's identity and access. In some embodiments, a single device (e.g., a mobile device) can be configured to comprise the point of presence 200B and the point of access 200C.

The system can be configured to execute the process flows for identity monitoring (e.g., steps 209-211) and verification (e.g., 201-208). For example, the system can be configured for continuous biometric and behavioral information, monitoring while providing a central authentication process. In various embodiments, the system includes an initial registration process that binds a specific mobile device based on device fingerprint with a user identity, for example, for a relying party (e.g., service provider or authenticated service). The initial registration process can be configured to use unique public-private key pairs and intermediate mapping using universally unique identifiers to preserve privacy, ensure cryptographically sound results, and ensure only the original registered devices are allowed to authenticate users.

One example process flow for verification begins at step 201 where a user accesses a cloud or enterprise service through an intermediate system 200C at a point of access. In some embodiments, the intermediate system 200C is collocated with a point of presence of the user. Next, the process proceeds to step 202 where, using the intermediate system 200C, the user provides identity information (e.g., a username and/or password). Next, at step 203 the ambient authentication service 200A requests verification that the user is who the user claims to be. In one embodiment the authentication service 200A uses a challenge to be cryptographically satisfied. Next, at step 204, an agent computes device and ambient fingerprint information that represents the location and environment of that system. The agent further forwards the ambient fingerprints and the challenge to the ambient authentication service 200A.

Next, the process proceeds to act 205 where the ambient authentication service 200A verifies that the user is conforming (i.e., that the user is and has been in possession of the mobile device 200B). The possession of the mobile device 200B and inherence (e.g., behavioral and biometric profile) factors can be used by the ambient authentication service 200A to assure identity of the user. Next, the process proceeds to act 206 where the ambient authentication service 200A requests the client (i.e., point of presence 200B) to provide fingerprints and to satisfy a new challenge. The new challenge may be signed using a trusted execution environment and secure key stored on the mobile device 200B.

Next, at step 207, the ambient authentication service 200A determines whether fingerprints are sufficiently similar. In some embodiments, the ambient authentication service 200A may determine if fingerprints received from mobile device 200B and the fingerprints received from the point of access device 200C are sufficient similar. Additionally or alternatively, the ambient authentication service 200A may determine whether received fingerprints are sufficiently similar to registered and approved fingerprints (e.g., device and ambient fingerprints).

If the fingerprints are sufficiently similar, the authentication is verified. If, however, the fingerprints are different, the ambient authentication service 200A may allow the user to confirm on the mobile device 200B that future verifications are to be associated with the point of presence fingerprint received from the mobile device 200B. Then, at step 208, the verification state and the challenge response are sent to the relying party, which grants or denies access. The agent then continues to verify authentication and breaks authentication if a verification failure is detected.

In some embodiments, to monitor identity of a user, the ambient authentication service 200A includes a machine learning system that processes features to maintain and detect deviations in a user's activity (209). The ambient authentication service 200A identifies a user as conforming or non-conforming continuously at any point in time. Concurrently, the client (i.e., the mobile device 200B and the point of access device 200C) continuously record and communicate, to the ambient authentication service 200A, user movement (e.g., location and motion), activity in an application (e.g., network and screen usage information), and ambient fingerprints.

Various embodiments incorporate one or more aspects of ambient intelligence, location-based authentication, near field communication, continuous authentication, biometric and behavioral analysis, machine learning, and security standardization to achieve a novel and unobvious system which provides increased security while reducing the technical adoption burden over conventional systems, and in further example, the implementation burden on end users. Discussed below are some principles associated with each of these elements that can be combined in various combination according to various examples.

According to one embodiment, the system implements ambient intelligence configured to use the digital environment that surrounds users and devices, making the user and device environment responsive to users' presence and adaptive to users' needs without requiring explicit interaction. In one example, the system achieves such intelligence by engagement with available embedded technology and networks of sensors. The sensors bridge the digital and the physical environments and enable contextual awareness by the system. Conventionally, ambient intelligence has primarily been considered as a means of enabling (or targeting) the consumer in the form of smart homes, health monitoring and assistance, improving the collaboration in educational and workplace environments. The present disclosure redirects and repurposes these conventional implementations to achieve a more secure and efficient access control, identity and authentication system.

Geographical location information has previously been used in authentication decisions. Various embodiments of the present disclosure transcend these conventional approaches by and integrating user identity, and enable many features (of which location is just one) across points of user presence and access unlike such conventional location authentication approaches. Rather than use conventional NFC, the present disclosure describes implementation of solutions, for example, that do not use point-to-point communication for authentication, but will take authentication that detects point-to-point communication to enhance the detection of proximity between involved devices and/or fingerprinting of the signals as environment ambience to increase security.

Conventionally most authentication occurs at the point when a user requests access, and once the authentication is complete, a user's authentication can be misused or reused by an adversary. Continuous authentication attempts to deal with these shortcomings by re-authenticating a user over the lifetime of access and typically does so with authenticating the device that is being used to access a resource. Various embodiments of the present disclosure differ because they use the mobile device as the authenticator for a different device being used as the point of access. Other embodiments also enable the use of the mobile device as the point of presence and the point of access.

Biometric features can be physiological and behavioral. Physiological features are tied to natural anatomic features such as facial structure and fingerprints, while the behavioral features are based on style, habit, or preference such as how someone speaks, walks, or reacts under specific circumstances. Behavioral features can also include how a person goes about their activities such as what apps they use, when they use their device, and where they drive. Various embodiments target new behavioral biometric information, for example, gait as measured through the accelerometer, step counter/sensor, and through gravity and gyroscope sensors in mobile devices to authenticate and/or identify a user. The system can also capture environment or biometric data from secondary devices attached to a mobile (e.g., heart rate monitor, step counter, etc.).

According to some embodiments, the system includes machine learning approaches for delivering augmented authentication services. In one example, the machine learning approach includes at least two requirements: (1) anomaly detection algorithms for behavioral analysis and (2) nearest neighbor algorithms for fingerprint similarity. One problem resolved by various embodiments of the present system includes determining fingerprint similarity and solving a nearest neighbor search to find an item that is nearest another item under a distance measure. In one embodiment, locality sensitive hashing (LSH) is a solution for approximating nearest neighbor search that transforms data—such as set of sensor readings—into a low dimensional representation such as a bit sequence and allows hashes to be compared such that the distance between the hashes represents the distance between the original high-dimensional data.

In some embodiments, the system is configured to determine implicit behavior of a user. The system can learn about the user without asking the user to take any action. For example, the system can be configured to analyze the user's gait, how the user interacts with a device (e.g., smart phone, computer) and/or application on the device. The system can track the way the user swipes, touches, types and executes other actions on the device. In some embodiments, the system is configured to collect data from device sensors (e.g., accelerometer, gyroscope, touch sensors). In one embodiment, the system continuously gathers sensor readings. The system can further learn patterns associated with a user. In one embodiment, the system can learn patterns associated with a gait of a user. For example, the system can track step length, stride length, cadence, speed, progression line, foot angle, and/or hip angle based on collected data. For device and/or application usage, the system can track patterns of flight time, dwell time, touch size, touch pressure, touch position, yaw, roll, pitch, acceleration, micro device movements, and typing seed based on collected data.

In some embodiments, the system is configured to process the data (e.g., clean, filter, normalize) and generate features. In some embodiments, the system is configured to build a feature set that most accurately classifies a user. For example, the system can use feature extraction and reduction techniques (e.g., principle component analysis) to generate a set of features that best indicates legitimacy of a user.

In some embodiments, the system is configured to feed feature values associated with a user into a machine learning system. In one embodiment, the machine learning system can execute a classification algorithm (e.g., support vector machine, neural network, decision tree) to classify the user as a legitimate user or as an impostor. In some embodiments, the machine learning system may have been previously trained on a training data set to learn to classify a user as legitimate or as an impostor. During an authentication, the system can collect data associated with a user requesting authorization. The system can generate feature values based on the collected data and feed them into the machine learning system to receive a classification output. The system can grant or reject access based on the output. In some embodiments, after authorizing the user the system can be configured to continuously monitor usage data. The system can monitor the data to detect anomalies in usage patterns from those of a known legitimate user. For example, the system may continuously generate feature values and feed them into a machine learning system. The machine learning system may, for example, continuously classify the user as legitimate or as an impostor. In some embodiments, the system may detect specific deviations in behavior patterns from the behavior patterns of a regular user. For example, the system is configured to detect a significant change(s) in gait, device usage, and/or application usage that triggers the system to terminate authorization of a user.

One problem of biometric and gait analysis can be the complexity associated with patterning biometric information and gait—according to one embodiment the issue can be thought of as a binary classification problem. Since it is labeled and numeric, the data is amenable to supervised learning algorithms like Support Vector Machines (SVM) and Multilinear Subspace Learning (MSL) and deep learning networks. Different algorithms can be used where more efficient: SVM is an effective binary classifier for the problem, while deep learning is most effective when adding and removing features. MSL is computationally efficient and can be used in some embodiments, but MSL can result in local optimums. Various embodiments, resolve the problems with supervised training sets (e.g., pre-classified training data sets are used to model subsequent data, modeled data can be reviewed by human operators to approve models and use for training and subsequent modelling, etc.).

Various embodiments of the system are configured to interact with other security systems and/or implementation, including, for example, standards based security systems. Various embodiments build and improve on the standards developed for the Fast IDentity Online (FIDO) Alliance's Universal Authentication Framework. The FIDO framework addresses the low-level registration and authentication protocols and other requirements for interoperability, and includes extensive backing across the industry including Lenovo, PayPal, Google, Microsoft, Bank of America, Goldman Sachs, RSA, Netflix, ARM and MasterCard. Thus integrating with such features enables various embodiments of the present system to enhance any standard compliance security system. Other embodiments, can also integrate with other authentication systems such as Remote Authentication Dial in User Service (RADIUS) and OpenID Connect, and can complement Federated Identity Management (FIM) frameworks, such as OpenID and SAML, as well as web authorization protocols, such as OAuth.

Example Implementation Elements

Various embodiments combine features discussed above to deliver improved security services to various enterprise systems and/or authenticated service providers, among other examples. These embodiments can implement any of the features, elements, or components described below to delivery improved security systems. According to one embodiment, the example features can include multiple authentication levels.

In one embodiment, the system is configured with at least four levels of authentication—source, location, proximity and identity. The levels of authentication can be facilitated and secured by the authentication service (e.g., see FIG. 1, 108). According to one aspect, each authentication level is configured to be additive. Each level builds on the capabilities and inherits the security features and controls of the prior level. Although in various embodiments, the authentication levels can be used independently, in partial combination, or in any combination of the levels, and/or sub-combination of elements of the levels.

Source Authentication Level

Source authentication can be based on cryptographically identifying an agent device at the point of access and only allowing access to points of service from approved devices. According to one embodiment, source authentication is based on the originating device independent of environment or proximity (e.g., proximity authentication discussed below can be in conjunction with source authentication). Conceptually, the system can implement a methodology of white-listing the devices and web browsers that are allowed to access applications via agents. In one example, this white-listing improves security as an adversary using a different system (even assuming they have compromised every other security feature) from one that has been previously approved will be unable to access cloud applications (e.g., even if they possess stolen credentials). Although source authentication can improve security, source authentication does not assure that a user is present, only that access is occurring from a known source. In various embodiment, source authentication provides significant advantage over various conventional security implementations, including reduced complexity in deployment (e.g., for source authentication no mobile device is required) and fewer technical dependencies (e.g., no hardware sensors or advanced capabilities are required).

Ambient Authentication Level

As discussed, the system incorporates various ambient authentication features, for example, to ensure that only points of presence in previously approved locations (e.g., those with unique digital and environmental ambience that surrounds a point in space (e.g., not just GPS or geolocation data)) that can be used to access points of service. Conceptually, the system can achieve a whitelist of the locations (identified by ambient fingerprints) that can be used to control access to applications in addition to the devices themselves.

In various embodiments, location can be based on an ambient fingerprint that is constructed from sensor readings on mobile devices. In further embodiments, the accuracy of these readings can be enhanced through ambience generators distributed and/or installed within the environment that create unique and precise signals for fingerprinting. In some examples, ambience generators are installed and generate active ambience signals to aid in creating an ambient fingerprint. In other examples, the generators can be triggered by the system.

In one example, if a user's work and home locations were previously approved, the user can access cloud applications using their notebook computer from either location, but would be unable to do so from the coffee shop down the street until that location is identified and approved on the system. The system can also be configured to provide temporary or permanent approval for new locations. In one example, administrators on the system may allow, delegate or restrict such approval decisions. In further examples, administrators may specify system settings that enable the system to automatically allow, disable, delegate or restrict such approval decisions.

Ambient authentication increases the assurance that a user is present because it verifies, for example, that access is occurring from a known source and in a known location based on the presence of a previously enrolled mobile device for a user. Various embodiment are configured on the assumption that the user is in possession of the mobile device at the time of access.

If an adversary has compromised the point of access where the browser agent exists and obtains the keys and device information, then that information can be combined with stolen credentials to access applications as long as the mobile device exists in an approved location (as might be the case if the user is at work during the attack). This risk is mitigated by proximity detection discussed in the next section. In other embodiments, the system can also resolve a case where the point of access could be compromised through malware, etc.—by requiring some kind of user intervention to distinguish malware vs. a real user (e.g., a 'real user presence test' via CAPTCHA or push notification or other option) in addition to making sure user's smartphone is within specified geolocation and in proximity of the point of access (being done without any user interaction and completely behind the scene). In further embodiments, CAPTCHA or push requirements can also be enabled/disabled by the admin per employee using admin console. Ambience based authentication can also be configured to enable the system to continuously monitor a location and detects when the user (through the mobile device) is no longer present at the point of access. This allows the system (e.g., authentication service (e.g., through a browser agent)) to break the authentication session if conditions are no longer approved.

Proximity Authentication Level

Further embodiments tie proximity authentication into the system and enable detection of the proximity of two systems to one another (e.g., the point of presence and the point of access) by correlating passive sensor readings of the ambient digital and physical environment from both points of view, and in some examples, by active signaling between the points using techniques like ultrasonic sound, Bluetooth and NFC. Incorporating proximity authentication, enables the system to limit access to only systems that are co-located or are present in previously approved pairings of location (e.g., to address remote access cases). Similar to source authentication, the system can implement proximity authentication to achieve improved whitelist filtering of users and devices—e.g., limiting whitelist the devices and locations used at both the point of access and the point of presence.

Various embodiments use this level of authentication to offer a high degree of assurance that a user is present and that the authentication is intentional. An adversary that obtains stolen credentials and even the device information and keys used by the agent will be unable to authenticate because the ambience reported from the point of access and that reported by the point of presence will be different.

Identity Authentication Level

Identity authentication can be based on the continuous analysis of biometric and behavioral readings from a user's mobile device. This includes patterns of movement (both location and motion or gait), patterns of activity (application use, network and service use, screen and keyboard interactions), and authentication history. As long as these patterns are (and continue to be) consistent with the past, the user's identity is established for authentication.

The continuous authentication introduced in the location authentication level is extended to include identity. If at any point after the user is authenticated an anomaly is detected in biometric or behavioral readings, then the user's access to the authenticated service can be terminated.

This level of authentication offers the highest degree of user presence assurance and intent. When used in conjunction with proximity authentication, identity authentication adds the assertion that the identified user was in possession of the mobile device at the time of the authentication request. Additional embodiments extend identity authentication to provide identity assertions and management and eliminate the need for passwords.

Example Interactions

Various elements and security layers interact to provide various implementations of authentication services. Some embodiments include interactions based on enrollment, registration, and authentication. Within each logical grouping of interactions small exchanges support the overall interaction. Although not described with the same level of detail, additional administrative interaction also support various implementation of the system (e.g. update registrations, un-enroll devices, remove users, among other options).

Communication of information on the system is executed over secured communications channels (e.g., HTTPS, VPN, SSL, etc.) and can, for example, use standard public key cryptography to sign and verify messages and negotiate session tokens.

Agent Enrollment Examples

According to one embodiment, agent enrollment is the process by which a device—browser or mobile etc.—is enabled for authentication services. In one example, agent software is installed on a device, and when executing coordinates the enrollment and subsequent activities via background processes.

In further embodiments, the target authentication service can be discovered through one of several mechanisms, depending on the device. For example the mechanism that the system can implement include:

A web link with a unique one-time-use token for a user identity can be provided through email, SMS or a console web page (e.g., generated and communicated to the device by the system automatically or by the service provider). Execution of the link on the device to enroll is sufficient to initiate and complete the enrollment process automatically—the system is configured to accept the enrollment request and configure the device for use of the authentication service. In some examples, the link generation and distribution can be automated based on existing account information.

A QR code with encoded information that can be used by mobile devices to complete the enrollment process. The code includes specification of the target server, user and a one-time-use token. QR codes can be scanned directly or emailed to users, and trigger the system to automatically enroll and configure the device for use of the authentication service.

An enrollment option for users logged on to the authentication service console to enroll the current browser or generate the above enrollment mechanisms. In some examples, the system provides a web presence that the end users can access. The system can capture necessary device information based on the user's login and enroll the device and user (e.g., including agent installation) for use of the authentication service.

According to one embodiment, during enrollment, the agent generates a public-private key pair and computes a unique fingerprint that identifies the device and its configuration. The public key and device fingerprint can be presented to the server and associated with a specific user identity. The private key can be maintained in a local trusted key store and used to sign and verify messages exchanged with the authentication service.

Browser Enrollment Examples

According to one embodiment, individual browser instances can be enrolled with one user identity at a time. For example, browser instances are unique to each platform user, and thus it is possible to share desktop or laptop systems across multiple users as long as each has a unique local account. According to some embodiments, private keys and device fingerprints can be maintained separately for each local user based on the capabilities available in the operating system platform. In some examples, the system is configured to test capabilities of the end user device to ensure proper capability to use the authentication service (e.g., local trusted key store available, validate local accounts and separate key stores for users, etc.). In further embodiments, a user is able to register as many different browsers on as many different systems as necessary to support their access requirements.

Figure 3:
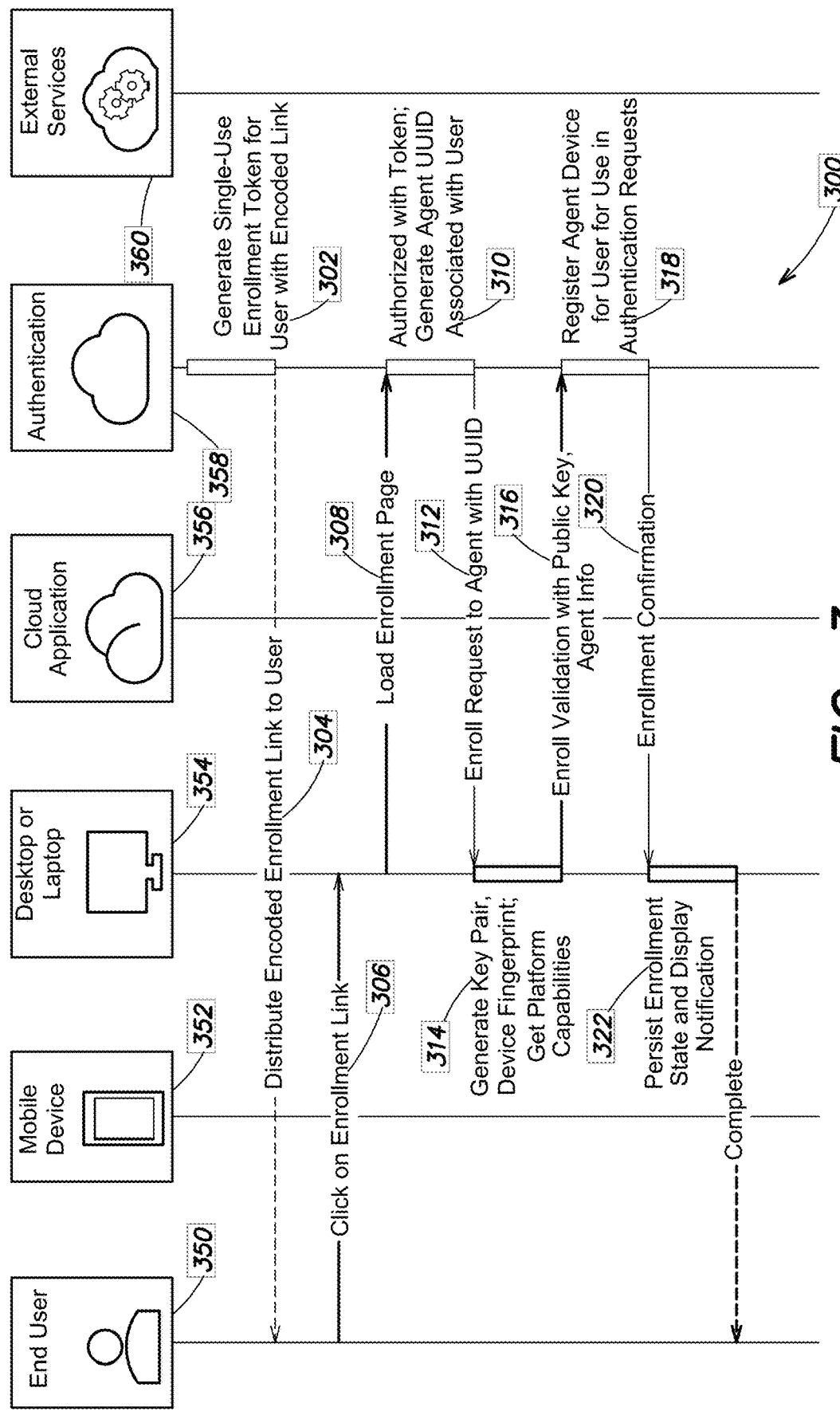
FIG. 3 is a block diagram of example system components with data exchange and flow, according to one embodiment.

FIG. 3 illustrates an example process and data exchange flow 300 among system components for enrolling a point of access device (e.g., laptop or desktop) 354 for authentication. In some embodiments, an end user 350 may access a cloud application 356 via a laptop or desktop 354. The end user 350 may have a point of presence (e.g., a mobile device) 352. An authentication service 358 can be configured to manage access of the user 350 to the cloud application 356. The system can also include external services 360 to execute various processes.

The process for enrolling the point of access device 354 begins at step 302 where the authentication service 358 generates a single-use enrollment token for a user encoded with a link. Next, at step 304, the authentication service 358 distributes the encoded enrollment link to an end user 350. For example, the authentication service 358 may distribute the encoded enrollment link to a desktop or laptop 354 accessed by the user 350. Next, at step 306, the user 350 clicks on the enrollment link 306 on the desktop or laptop 354. Then, at step 308, the desktop or laptop 354 loads the enrollment page. Next, at step 310, the authentication service 358 authorizes the user using the enrollment token. Additionally, the authentication service 358 generates an agent universal unique identifier (UUID) associated with the user 350.

Next, at step 312, the authentication service 358 transmits an enrollment request to an agent executing on desktop or laptop 354 with the generated UUID. Then, at step 314, the desktop or laptop 354 generates a key pair and device finger print information. Additionally, the desktop or laptop 354 gets platform capabilities of the system. Next, at step 316, the desktop or laptop 354 transmits an enrollment validation including a public key and the agent information to the authentication service 358. At step 318, the authentication service 358 registers the agent device for the user 350 for use in authentication requests. At step 320, the authentication service 358 transmits the enrollment confirmation to the desktop or laptop 354. After receiving the enrollment confirmation, the desktop or laptop 354 can persist the enrollment state and display a notification to complete the process at step 322. The authentication service 358 can then use the enrollment to verify the user 350 requesting access to a cloud application 356.

In some embodiments, the process flow described with reference to FIG. 3 can be configured for web browser enrollment. In some examples, incognito or in-private browser sessions may interfere with registration as they limit persistent storage of enrollment information—in these instances the system can notify an end user of an issue with the current access session and display a suggestion for opening new sessions without the privacy settings. When just a browser is enrolled source-based authentication is possible. Additional enrollments options enable further layers of the security platform.

Mobile Device Enrollment Examples

According to one example, mobile device enrollment can be executed through QR codes that are emailed or presented to users on a web page, or via SMS messages sent to the mobile number (e.g., registered for a user or associated with an invitation).

Figure 4:
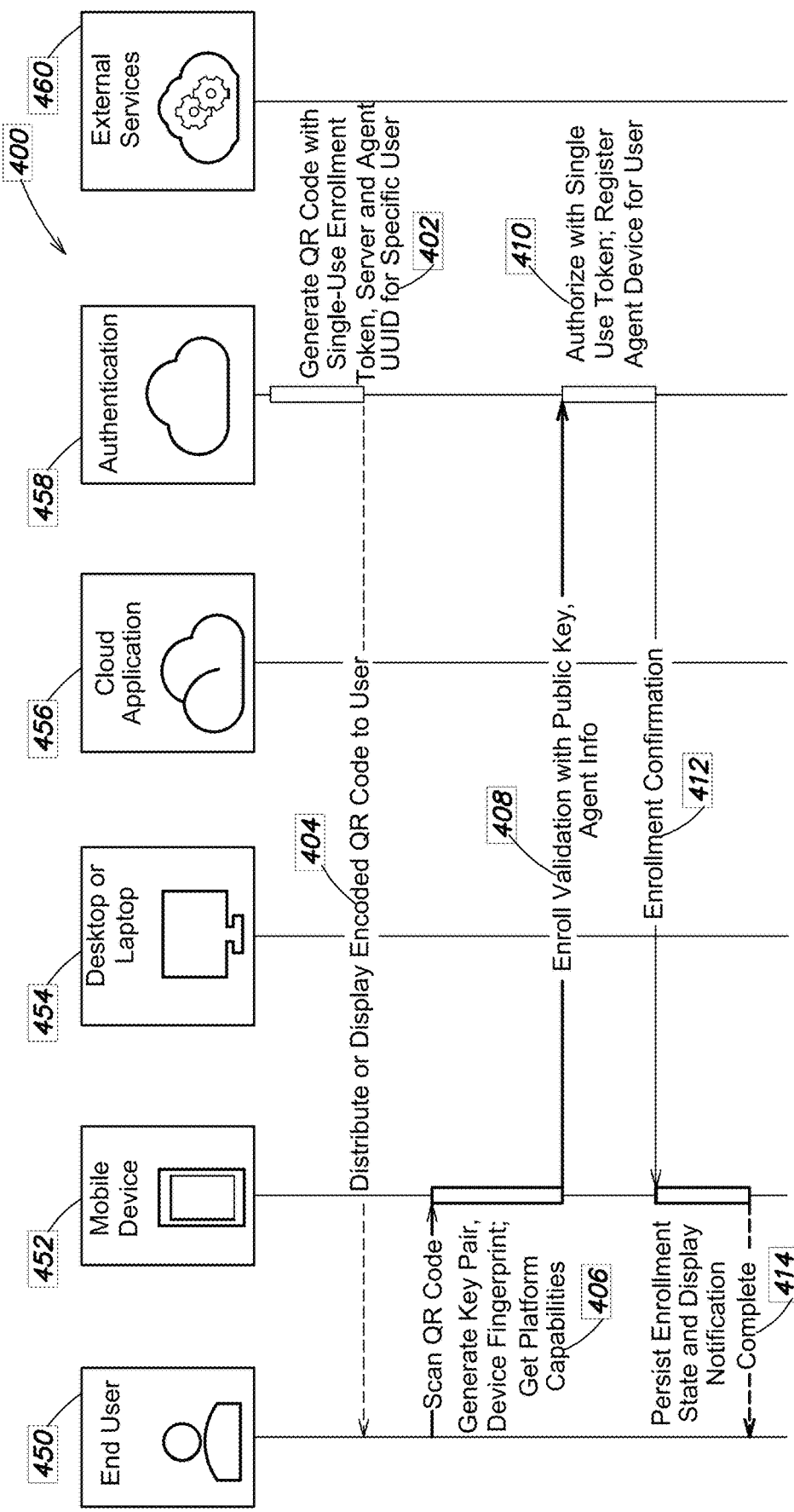
FIG. 4 is a block diagram of example system components with data exchange and flow, according to one embodiment.

Shown in FIG. 4 is an example process flow 400 for mobile device enrollment and implicated system components that exchange information/perform operations during execution. In some embodiments, an end user 450 may access a cloud application 456 via a laptop or desktop 454. The end user 450 may have a point of presence (e.g., a mobile device) 452. An authentication service 358 can be configured to manage access of the user 450 to the cloud application 456. The system can also include external services 460 to execute various processes.

The process of enrolling a mobile device 452 begins at step 402 where the authentication service 458 generates a QR code with a single-use enrollment token, server, and an agent UUID for a specific user. The agent UUID may, for example, have been obtained during enrollment of a point of access device 454 as described above with reference to FIG. 3. Next, at step 404, the authentication service 458 distributes and/or displays the encoded QR code to the user 450. In some embodiments, the authentication service 458 may distribute and/or display the QR code on the desktop or laptop 454. Next, at step 306 the user 450 scans the QR code using the mobile device 452. The mobile device 452 then generates a key pair, a mobile device 452 fingerprint, and gets platform capabilities of the mobile device 452. Next, at step 408, the mobile device 452 transmits the enrollment validation with a public key and agent information to the authentication service 458. At step 410, the authentication service 458 authorizes the enrollment with a single use token and registers the agent device 452 for the user 450. After authorizing the enrollment, the authentication service 458 transmits an enrollment confirmation to the mobile device 452 at step 412. At step 414, the mobile device 452 persists enrollment state and displays a notification of the enrollment state on the mobile device 452 to complete the mobile device 452 enrollment process. After completion of the enrollment process, the mobile device 452 can be used by authentication service 458 to verify a user 450 accessing cloud application 456.

Agent Session Token Example

According to some embodiments, the initial enrollment exchange is authorized based on a limited-use token generated by the authentication service. This token has both use-count and time-based restrictions and may not provide access to any other APIs (an exception is noted below). According to one embodiment, subsequent communication can invoke an agent session token that is used to authorize access to APIs.

As discussed above, agents have a private key that can be used to sign messages sent to the authentication service and verify messages received from the service. To improve executional efficiency (e.g., because this is an expensive operation and limits the ability to leverage standard HTTPS authorization methods) agents cryptographically sign a challenge to obtain time-limited session tokens.

Figure 5:
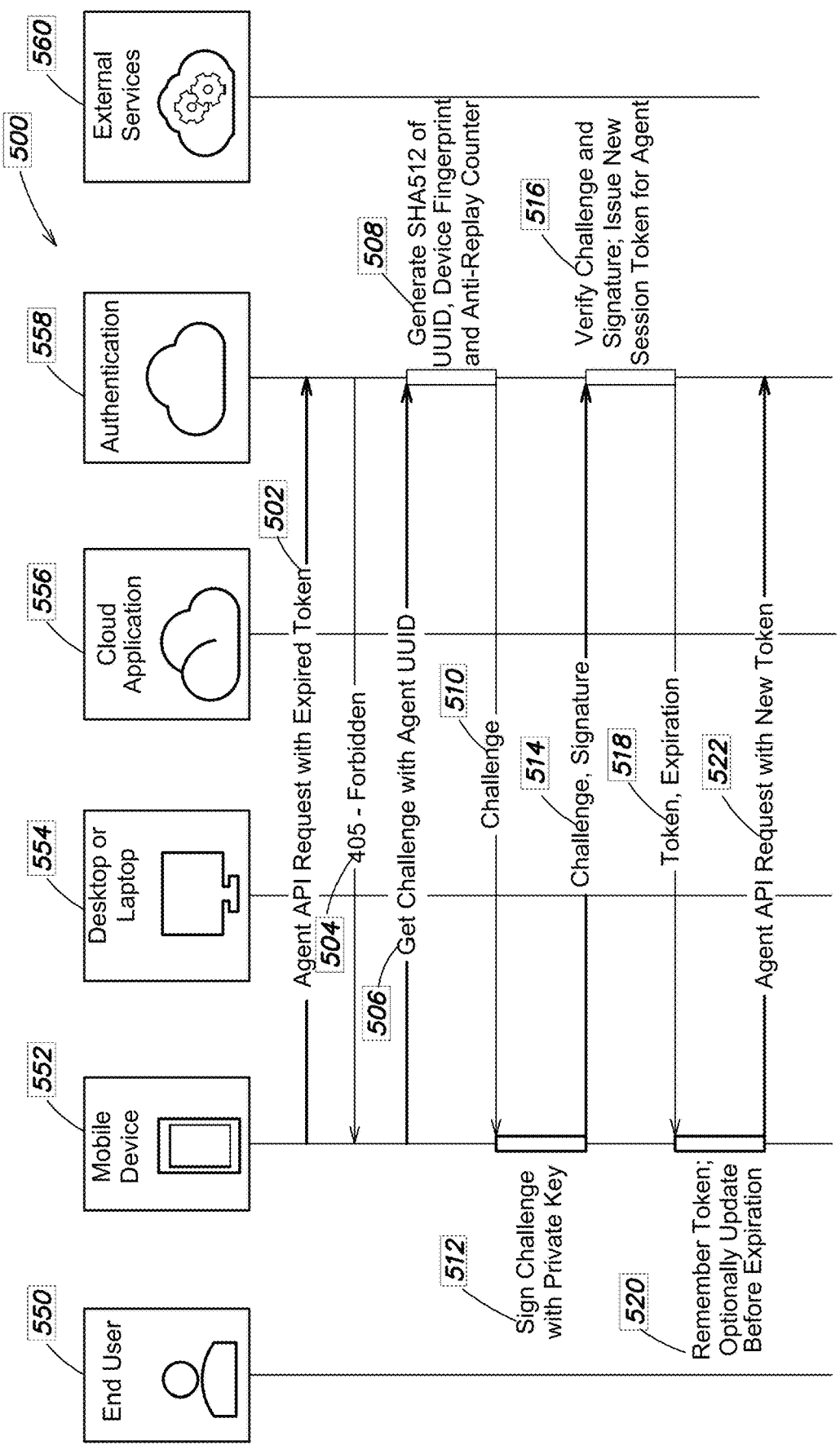
FIG. 5 is a block diagram of example system components with data exchange and flow, according to one embodiment.

FIG. 5 illustrates an example process flow and data exchange 500 among system components for a mobile device 552 to refresh. In some embodiments, an end user 550 may access a cloud application 556 via a laptop or desktop 554. The end user 550 may have a point of presence (e.g., a mobile device) 552. An authentication service 558 can be configured to manage access of the user 550 to the cloud application 556. The system can also include external services 560 to execute various processes.

The process of refreshing a token for the mobile device 552 begins at step 502 where the mobile device 552 transmits an agent API request with an expired token to authentication service 558. In response, the authentication service transmits an error (e.g., 405-Forbidden message) to the mobile device 552 at step 504. Next, at step 506, the mobile device 552 requests a challenge using a UUID of the agent from the authentication service 558. At step 508, the authentication service generates a challenge comprising an encryption (e.g., an SHA512 encryption) of the UUID, a device fingerprint, and an anti-replay counter. Next, at step 510, the authentication service 558 transmits the challenge to the mobile device 552. The mobile device 552 then signs the received challenge with a private key at step 512 and transmits the challenge with the signature to the authentication service at step 514. Next, at step 516, upon receiving the challenge and the signature, the authentication service 558 verifies that the challenge and the signature and then issues a new session token for the agent on the mobile device 552. At step 518, the authentication service 558 transmits the new session token and an expiration time to the mobile device 552. At step 520, the mobile device 552 stores the token. In some embodiments, the mobile device 552 can be configured to automatically update the token before expiration based on the received expiration time. At step 522, the agent on the mobile device 552 transmits an API request with the new token to the authentication service 558.

According to one embodiment, the challenge request API is the only API that allows access without having a session token first. In one example, the challenge request API is configured to require that the agent present a valid agent UUID to access the challenge request API or complete the challenge response request. The challenge presented by the server can be, in one example, a SHA512 digest of the agent UUID, device fingerprint and an increasing request counter (e.g., monotonically increasing). The challenge can be constructed, for example, as above to counter replay attacks. The challenge can be signed by the mobile device agent using the private key generated during enrollment. In some embodiments, the mobile device can execute the signing operations within a trusted execution environment (e.g., where a trusted execution environment is available—the system can be configured to detect this option based on device analysis). In further embodiments, agents return the challenge along with a signature in order to obtain a session token. In one example, the challenge must match what was produced on the server and the signature verify with the public key provided during enrollment. In advance of session token expiration (or upon discovering that a token is expired), the agent is configured to automatically request a new session token. As discussed above, similar procedures can be executed to enable FIDO U2F registration and authentication.

Device Fingerprint Examples

According to one embodiment, a device fingerprint uniquely identifies the browser or mobile device participating in the authentication system. The fingerprint can include a hash of any one or more of: critical system configuration information, vendor information (e.g. make, model, and capabilities), serial number, and other data. In various implementations, device fingerprints are configured to provide at least two features: (1) differentiate between local users (e.g. mobile user profiles or desktop accounts); and (2) do not match across factory device resets or system reinstalls.

Ambient Fingerprint Examples

Various embodiments, enhance security via an ambient fingerprint. According to one embodiment, the ambient fingerprint is constructed from sets of sensor readings that are used to collectively define (with high assurance) a location in space and the unique environment that surrounds the location (e.g., at any given time for the location). In one example, the system is configured to invoke ambient fingerprinting for both the point of presence (e.g., via mobile sensor readings) and for the point of access (e.g., via desktop or laptop sensor readings). Sensor is used to refer to anything that can provide a metric that can be used to recognize a person, place or activity. While desktops and laptops lack many of the sensors found in mobile devices, these systems still provide the basis for correlation with mobile devices, e.g., through detection capabilities for ambient signal information like Wi-Fi, wired network, Bluetooth, camera, and sound—and where available any additional sensor readings (e.g., humidity, temperature, etc.) can be incorporated into ambient fingerprints. In further embodiments, the system is configured to discover available sensors on a user's computer system, and capture ambient information via any available sensor.

According to other embodiments, sensor capability can capture environment data (e.g., pressure, humidity, gravity, sound, light, temperature, etc.) to build a fingerprint for verification. Other devices may also be invoked to capture environment data (e.g., fitness devices, health monitoring devices, etc.).

According to some embodiments, ambience can be encoded as fingerprints for multiple points of presence (e.g., location of mobile device, laptop/desktop, etc.) and may include multiple locations for a single point of presence, and each location includes an associated fingerprints.

According to various embodiments, the system is configured to apply machine learning to the fingerprints of approved locations (e.g., variable density HDBSCAN clustering applied to geolocation and signal data, which may include normalizing scaling, with nonlinear kernel principal component analysis to reduce the number of dimensions before applying clustering) so that the system can initially identify matching fingerprints with a few approvals and over time develop archetypes of locations based on matches. As the system executes each authentication, the system becomes better at recognizing the locations users are in— and consequently the system becomes more efficient and precise at differentiating those locations from other locations.

According to some embodiments, the system is configured to generate a fingerprint(s) based on one or more features. In some embodiments, the system can use geolocation specific attributes to generate features. For example, geolocation specific attributes can include location coordinates and/or network information such as signal strength, received signal strength indication (RSSI) value, service set identifier (SSID), communication tower IDs, identities of other devices on the (e.g., mac addresses and IP addresses), and network hardware manufacturers. The system can collect information associated with one or more attributes and generate features using the collected information. In another example, the system can collect RSSI values from device(s) and set it as a feature value. In another example, the system can derive a feature value as a function of a collected RSSI value.

According to some embodiments, the system is configured to feed values of features generated from the geolocation specific attributes into a machine learning system to generate fingerprint(s). The set of features may result in a particular output of the machine learning system that is characteristic of the geolocation. For example, the machine learning system may execute a clustering or classification algorithm that classifies data into respective clusters or classes. The system may feed feature values into the machine learning algorithms to achieve a particular result (e.g., classification, clustering) that is unique to the geolocation. In some embodiments, a learned fingerprint(s) can comprise attribute values, feature values, and/or an output of the machine learning system.

According to some embodiments, the system is configured to authenticate by matching to a learned ambient fingerprint of an authorized location (e.g., an authorized point of access location). In some embodiments, the system can be configured to determine whether attributes and/or features of a given location (e.g., a point of presence) match those of the authorized location. The system can be configured to collect information about various attributes (e.g., location coordinates, network information) and use them to derive feature values. In some embodiments, the system can then feed the features into a machine learning system to determine whether an output for a given location (e.g., a learned fingerprint) matches that of an authorized location. For example, the machine learning system can execute a clustering or classification algorithm. The system can feed attribute and/or feature values into the machine learning system to generate a result associated with the location (e.g., a classification or clustering result). The system can then determine whether the result matches an output (e.g., a fingerprint) of the authorized location. In some embodiments, the matching approach (e.g., few analyses of a location), the system is configured to optimize for minimal approvals and maximum matching.

According to some embodiments, the system can further be configured to cleanse, normalize, and/or reduce the number of features. The system may, for example, collect information associated with a plurality of different features. Each feature has a scale, level of effect on the ambient fingerprint, and other characteristics unique to values of the feature. In some embodiments, the system can normalize feature values (e.g., by scaling to a range of values). In some embodiments, the system is configured to reduce the number of features. For example, the system can select the features that have the greatest level of variance relative to geolocation. In some embodiments, the system can also cleanse features. For example, the system can process values associated with a feature (e.g., average, filter, integrate) in order to produce a final feature value(s). In another example, the system can execute principle component analysis (PCA) to cleanse, normalize, and/or reduce the number of features.

According to other embodiments, the system tailors each verification to the point of presence and point of access. For example, the system determines overlap between sensors available between the point of presence and point of access and selects fingerprints that be verified on data obtained from both devices. In another example, historic fingerprints for a location are selected based on what sensor data is available for verification, thus the sensors for the point of presence and point of access do not necessarily have to match but either of the existing fingerprint information and available sensor need some overlap or the point of presence and point of access can have overlapping sensors to support verification.

In one example, the system clusters readings from all devices that match approved areas. Thus, the system can verify for one device that only has Bluetooth sensor data to match a device that only has Wi-Fi sensor data, if, for example, the archetypes that have been learned have data for both Bluetooth and Wi-Fi.

Fingerprint Comparison Examples

According to one embodiment, the system is configured to cluster authentication information (e.g., using H-DBSCAN). In one example, clustering is executed based on all signals rendered as value/strength (e.g. all wifi, cell, bt points by dBm, location by accuracy, etc.). In some embodiments, every match contributes all signal sources they have to the data set, which is continuously processed in the background to compute "archetypes" for future matches. In one example, a device with only wifi reference points can be matched against an archetype as long as prior matching devices have contributed wifi data. Thus, devices that have at least one sensor in common with an archetypes can still be matched. Since the system is configured to aggregate archetype across users, the system can end up with nonintuitive cases where two devices can match the same location even though they have nothing in common (e.g., no common sensors between the two devices), as long as the archetype includes relevant data. For example:

A→has wifi and gps and cell, data is clustered (e.g., archetype includes wifi and gps data)
B→has gps→matches
C→has wifi→matches B and C can both "match" a given location even though they lack sensors in common. According to one embodiment, ambient authentication systems protect perimeter-less cloud and enterprise applications with virtual boundaries that prevent the use of compromised credentials and stop unauthorized access. Various embodiments can be implemented to provide security as a service to define and defend, for example, geo-fences based on ambient intelligence and machine learning models of behavior.

Ambient Source Examples

According to one embodiment, modern devices come equipped with a wide variety of communication and sensor capabilities that can used to measure location (e.g. cellular, GPS, Bluetooth, and Wi-Fi), environment (e.g. camera, light, sound, temperature, pressure, and humidity), motion and position (e.g. acceleration, gravity, rotation, orientation, proximity, steps, and gait), and activity (e.g. device attachments, power use, screen events, text and network connections, and application use). Paired devices also can be used to increase the pool of available sensors almost exponentially. For example, the increasing use of wearables such as fitness monitors and watches extend sensors to other biometrics (e.g. heart, muscle, and even brainwave signals) and/or other ambient information capture capability. All of these sensor readings can be captured and incorporated in fingerprinting. In some examples, the system selects various combinations of sensor/ambient information to generate fingerprints—and may even do so dynamically. Tables I & II describe some examples of sensors and data captured by each sensor.

TABLE I

| Sensor | Description |
| --- | --- |
| Wi-Fi | Encodes the BSSIDs (unique network address), RSSIs (signal strength) and network attributes of a clustering of nearby access points (APs), as well as information about the Wi-Fi in use. |
| GPS | Encodes the fine-grained location longitude and latitude in degrees as well as accuracy, speed, bearing and altitude. |
| Cell | Encodes the CIDs (cellular ID), RSSIs, network type and attributes of the nearby cell antennas as well as the information for the primary cell service in use by the mobile device. Readings may be augmented with third-party public databases such as Google and OpenCellId. |
| Bluetooth | Encodes the UUIDs, RSSIs, device type and attributes, pairing and connection state of nearby Bluetooth devices. |
| Device | Encodes the set of device serial number, vendor and product information of physically connected devices (such as those attached to a USB port). |
| Power | Encodes charging and connectivity state of the device. |
| Humidity | Encodes the relative ambient humidity in percent (%). |
| Temperature | Encodes the ambient room temperature in degrees (e.g., Celsius (° C.)). |

TABLE II

| | |
| --- | --- |
| Step Detector | Used to recognize motion. Measures the number of steps taken by the user for movement detection and for user behavioral analytics. |
| Accelerometer | Used to recognize motion. Measures the acceleration force in m/s2 that is applied to a device on all three physical axes (x, y, and z), including the force of gravity. |
| Linear Acceleration | Used to recognize motion. Measures the acceleration force in m/s2 that is applied to a device on all three physical axes (x, y, and z), excluding the force of gravity. |
| Gravity | Used to recognize motion. Measures the force of gravity in m/s2 that is applied to a device on all three |
| Gyroscope | Used to recognize motion. Measures a device's rate of rotation in rad/s around each of the three physical axes (x, y, and z). |
| Light | Encodes the ambient light level (illumination) in 1x. |
| Magnetic Field | Encodes the ambient geomagnetic field for all three physical axes (x, y, z) in µT. |
| Orientation | Used to recognize motion. Measures degrees of rotation that a device makes around all three physical axes (x, y, z). |
| Pressure | Encodes the ambient air pressure in hPa or mbar. |
| Rotation | Used to recognize motion. Measures the orientation of a device by providing the three elements of the device's rotation vector. |
| Proximity | Used to recognize user. Measures the proximity of an object in cm relative to the view screen of a device. |

According to one embodiment, the system can be configured to use public-private key pairs and X.509 V3 certificates to cryptographically sign messages and challenges exchanged between agents and the authentication service. In one example, keys are generated using the elliptic curve digital signature algorithm ("ECDSA") and the NIST P-256 (aka ANSI X9.62 prime256v1 and secp256r1) curve. When supported by the underlying operating system platform and hardware (e.g., tested or determined compliant by the system), the key material is protected from unauthorized use by leveraging secure key stores and trusted execution zones to perform cryptographic operations. This prevents extraction from the agent process and from the device as a whole that could compromise security.

Integration with Other Systems

In various embodiments, ambient authentication can be invoked by various third party systems to increase confidence in security and authenticity. In some examples, ambient fingerprint systems can be called as a service by an existing application to enhance conventional security. For example, a secure mobile banking application can trigger execution of ambient fingerprinting functions. Based on the execution of the ambient fingerprinting functions, the location of the user can be verified as discussed above and regardless of the state of the remaining credentials (e.g. compromised or secure), the secure mobile banking application will only allow permitted access. In other examples, ambient fingerprinting functionality can be integrated directly into an application to provide the same functionality.

In another setting, a secure medical application can be improved via ambient fingerprinting functions. Not only can the system provider be certain that a user is authorized, but the system provider can also be certain that access is only occurring responsive to matching ambient fingerprinted locations. According to some embodiments, integration in this manner ensures that attackers cannot access sensitive patient information outside of a specified facility, permitted location, etc. Even online digital media distribution applications can be improved to incorporate (or call as a service) ambient fingerprinting functions and enable geographic constraints on digital media usage/distribution.

In further examples, internet based gaming and/or gambling can be permitted according to geographically restrictive gaming/gambling laws or requirements. Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 6:
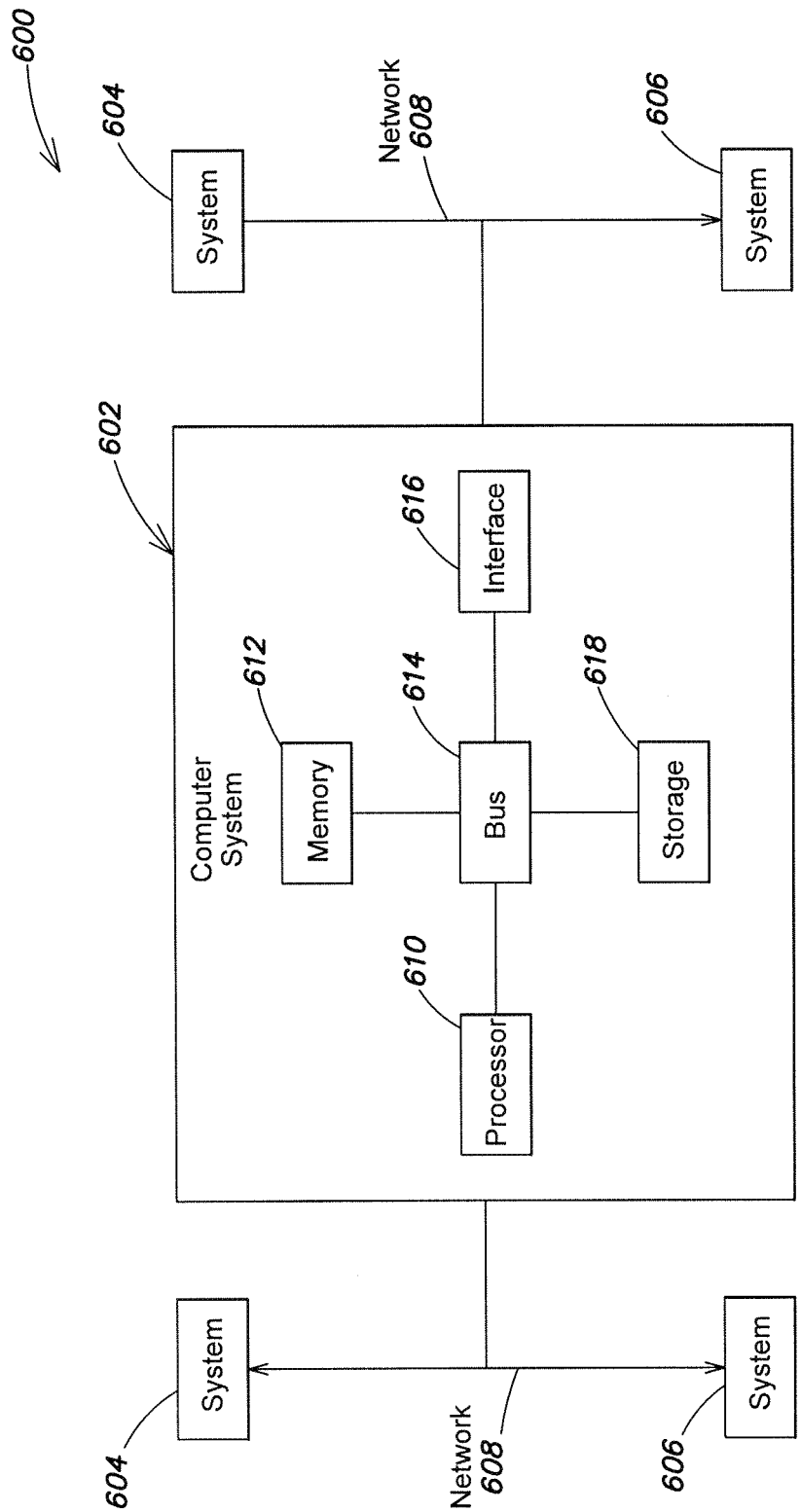
FIG. 6 is block diagram of an example special purpose computer system.

For example, various aspects, functions, and processes may be distributed among one or more computer systems configured to provide a service to one or more client computers, or to perform an overall task as part of a special purpose distributed system, such as the special purpose distributed computer system 600 shown in FIG. 6. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 6, there is illustrated a block diagram of a special purpose distributed computer system 600, in which various aspects and functions are practiced. As shown, the distributed computer system 600 includes one or more computer systems that exchange information. More specifically, the distributed computer system 600 includes computer systems 602, 604, and 606. As shown, the computer systems 602, 604, and 606 are interconnected by, and may exchange data through, a communication network 608. The network 608 may include any communication network through which computer systems may exchange data. To exchange data using the network 608, the computer systems 602, 604, and 606 and the network 608 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 602, 604, and 606 may transmit data via the network 608 using a variety of security measures including, for example, SSL or VPN technologies. While the distributed computer system 600 illustrates three networked computer systems, the distributed computer system 600 is not so limited and may include any number of computer systems and computing devices, networked using any medium and communication protocol.

As illustrated in FIG. 6, the computer system 602 includes a processor 610, a memory 612, an interconnection element 614, an interface 616 and data storage element 618. To implement at least some of the aspects, functions, and processes disclosed herein, the processor 610 performs a series of instructions that result in manipulated data. The processor 610 may be any type of processor, multiprocessor or controller. Example processors may include a commercially available processor such as an Intel Xeon, Itanium, Core, Celeron, or Pentium processor; an AMD Opteron processor; an Apple A4 or A5 processor; an IBM Power5+ processor; an IBM mainframe chip; or a quantum computer. The processor 610 is connected to other system components, including one or more memory devices 612, by the interconnection element 614.

The memory 612 stores programs (e.g., sequences of instructions coded to be executable by the processor 610) and data during operation of the computer system 602. Thus, the memory 612 may be a relatively high performance, volatile, random access memory such as a dynamic random access memory ("DRAM") or static memory ("SRAM"). However, the memory 612 may include any device for storing data, such as a disk drive or other nonvolatile storage device. Various examples may organize the memory 612 into particularized and, in some cases, unique structures to perform the functions disclosed herein. These data structures may be sized and organized to store values for particular data and types of data.

Components of the computer system 602 are coupled by an interconnection element such as the interconnection element 614. The interconnection element 614 may include any communication coupling between system components such as one or more physical busses in conformance with specialized or standard computing bus technologies such as IDE, SCSI, PCI and InfiniBand. The interconnection element 614 enables communications, including instructions and data, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and to communicate with external entities, such as users and other systems.

The data storage element 618 includes a computer readable and writeable nonvolatile, or non-transitory, data storage medium in which instructions are stored that define a program or other object that is executed by the processor 610. The data storage element 618 also may include information that is recorded, on or in, the medium, and that is processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller causes data to be read from the nonvolatile recording medium into another memory, such as the memory 612, that allows for faster access to the information by the processor 610 than does the storage medium included in the data storage element 618. The memory may be located in the data storage element 618 or in the memory 612, however, the processor 610 manipulates the data within the memory, and then copies the data to the storage medium associated with the data storage element 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having a different architectures or components than that shown in FIG. 6. For instance, the computer system 602 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system available from the Microsoft Corporation, a MAC OS System X operating system or an iOS operating system available from Apple Computer, one of many Linux-based operating system distributions, for example, the Enterprise Linux operating system available from Red Hat Inc., or UNIX operating systems available from various sources. Many other operating systems may be used, and examples are not limited to any particular operating system.

The processor 610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover one selection from A, B, C (e.g., A), two selections from A, B, C (e.g., A and B), three selections (e.g., A, B, C), and multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer system for continuous authentication, the system comprising:
a memory;
an authentication service, executed by at least one hardware processor, configured to manage access, including initial access, continuous authentication, and any subsequent access request, between an authenticating entity and a remote application or service, wherein the application or service is remote from the authenticating entity;
wherein the authentication service, executed by the at least one hardware processor, is configured to manage ambient digital information capture on enrolled devices over time and at any access request, and is further configured to:
receive ambient digital information captured from installed agents on the enrolled devices, the agents configured to capture the ambient digital information which includes device information, sensor information, and network information;
update the ambient digital information associated with respective authentication entities over time irrespective of authentication or access requests;
classify the received and updated ambient digital information to identify information associated with respective authenticating entities, including raw data, generated features, and machine learning models;
wherein the generated features include associations between the enrolled devices and characteristics of an ambient digital surrounding, wherein the characteristics include: information on each access request, associations between users, associations between devices, associations for users and devices, respective locations on captured information, proximity measures on captured information, inferred proximity information, co-location information derived from devices having common sensors, co-location information derived from a chain of devices without a direct communication path or common sensors;
wherein classification includes generation of the machine learning models to distinctly represent a given location in space based on at least one of the generated features or the raw data;
define an ambient fingerprint for unique locations based on at least one of the raw data, the generated features, or the machine learning models distinct to the unique location;
wherein responsive to an access request for the remote application or service, the authentication service, executed by the at least one hardware processor, is configured to:
require capture of current ambient digital information from a requesting device;
receive the ambient digital information identifying a location;
generate an ambient fingerprint identifying the location at a time of access from at least a portion of detected digital signals present at the current location reflected by at least the requesting device;
compare a stored ambient fingerprint for an authorized location to the ambient fingerprint generated at the time of access;
verify that there exists at least one stored ambient fingerprint of the authorized location that shares at least a common portion of the ambient digital information at the raw data, generated features, or machine learning model space that uniquely identifies a location in space with the ambient fingerprint identifying the location at the time of access to confirm that the requesting device is in the authorized location for the authenticating entity;
responsive to verification and valid comparison permit the access request for the remote application or service to continue; and
limit valid remote authentication and continued access session to one or more authorized locations associated with one or more stored ambient fingerprints, such that valid remote authentication occurs at respective authorized user locations for the authenticating entity, wherein the system is further configured to prevent any access from unauthorized locations and disable any access session upon leaving the respective authorized locations.

2. The computer system of claim 1, wherein the system is configured to generate the ambient fingerprint for the authorized location based on ambient digital information taken at or proximate to the authorized location over time and maintain historic ambient fingerprints for respective authorized locations.

3. The computer system of claim 2, wherein the system is configured to generate the ambient fingerprint based on information from any one or more sensed ambient digital factors including one or more of sound, Wi-Fi signals, Bluetooth signals, GPS data, cellular signals, temperature, lighting, humidity, device information, and network information.

4. The computer system of claim 1, wherein the system is configured to incorporate active signaling by artificially generating digital signals to be detected by the corresponding sensors available in the enrolled devices in the system and become part of the ambient fingerprints.

5. The computer system of claim 1, wherein the authentication service is configured to continuously monitor the ambient digital information being sent from all of the enrolled devices in the system to generate, match, store, update respective ambient fingerprints.

6. The computer system of claim 5, wherein the authentication service is configured to:
detect that the ambient digital information does not match the ambient fingerprint for the authorized location; and
terminate access to the remote application or service responsive to the detecting.

7. The computer system of claim 1, wherein the authentication service is configured to:
determine that the ambient digital information received does not match the at least a portion of the ambient finger print; and
request confirmation that, during future verification, the authentication service compares ambient digital information received from the requesting device during the future verification to a second location currently indicated by the ambient digital information.

8. The computer system of claim 1, wherein the authentication service is configured to:
track movement of the authenticating entity; and
terminate access to the remote application or service responsive to identifying movement of the authenticating entity that results in latest ambient fingerprint at the authenticating entity's new location not matching with any of the stored ambient fingerprints of the authorized locations for the authenticating entity.

9. The computer system of claim 1, wherein the authentication service is further configured to:
- responsive to any access request for the remote application or service by the authenticating entity, trigger a plurality of enrolled devices associated with the authenticating entity including at least an authenticating entity's mobile device to capture and communicate currently detected ambient digital information to the authentication service; and
- incorporate such ambient digital information in generating the ambient fingerprint at the time of access;
- wherein the valid comparison includes verification that the requesting device and the mobile device associated with the authenticating entity are in proximity to each other based on raw data, generated features, and machine learning models that learn the proximity measures between enrolled devices.

10. The computer system of claim 1, wherein the authentication service is further configured to: define the authorized location to include a remote connection and respective remote location for the requesting device relative to the authorized location, establishing a pairing between the remote location and the authorized location that can be verified as part of the valid comparison.

11. A computer-implemented method, executed by at least one hardware processor, of managing access, including initial access, continuous authentication, and any subsequent access request, between an authenticating entity and a remote application or service, wherein the application or service is remote from the authenticating entity, the method comprising:
- receiving, by the at least one hardware processor, ambient digital information captured from installed agents on enrolled devices, the agents configured to capture the ambient digital information which includes device information, sensor information, and network information;
- updating, by the at least one hardware processor, the ambient digital information associated with respective authentication entities over time irrespective of authentication or access requests;
- classifying, by the at least one hardware processor, the received and updated ambient digital information to identify information associated with respective authenticating entities, including raw data, generated features, and machine learning models;
- wherein classifying includes:
  - generating, by the at least one hardware processor, the generated features to include associations between enrolled devices and characteristics of an ambient digital surrounding, wherein the characteristics include: information on each access request, associations between users, associations between devices, associations for users and devices, respective locations on captured information, proximity measures on captured information, inferred proximity information, co-location information derived from devices having common sensors, co-location information derived from a chain of devices without a direct communication path or common sensors;
  - generating, by the at least one hardware processor, the machine learning models to distinctly represent a given location in space based on at least one of the generated features or the raw data; and
  - defining, by the at least one hardware processor, an ambient fingerprint for unique locations based on at least one of the raw data, the generated features, or the machine learning models distinct to the unique location;
- responsive to receiving an access request for the remote application or service, requiring the requesting device capture of current ambient digital information;
- receiving, by the at least one hardware processor, the ambient digital information;
- generating, by the at least one hardware processor, an ambient fingerprint identifying a location at a time of access from at least a portion of detected digital signals present at the current location reflected by at least the requesting device;
- comparing, by the at least one hardware processor, a stored ambient fingerprint for an authorized location to the ambient fingerprint generated at the time of access;
- verifying, by the at least one hardware processor, that there exists at least one stored ambient fingerprint of the authorized location that shares at least a common portion of the ambient digital information at the raw data, generated features, or machine learning model space that uniquely identifies a location in space with the ambient fingerprint identifying the location at the time of access to confirm that the requesting device is in the authorized location for the authenticating entity;
- permitting, by the at least one hardware processor, the access request for the remote application or service to continue responsive to the verifying and valid comparison; and
- limiting, by the at least one hardware processor, valid remote authentication and a continued access session to one or more authorized locations associated with one or more stored ambient fingerprints, such that valid remote authentication occurs at respective authorized locations for the authenticating entity, wherein the system is further configured to prevent any access from unauthorized locations and disable any access session upon leaving the respective authorized locations.

12. The computer-implemented method according to claim 11, further comprising: generating the ambient fingerprint for the authorized location based on ambient digital information taken at or proximate to the authorized location over time and maintaining historic ambient fingerprints for respective authorized locations.

13. The computer-implemented method according to claim 12, further comprising: generating the ambient fingerprint based on information from any one or more sensed ambient digital factors including one or more of sound, Wi-Fi signals, Bluetooth signals, GPS data, cellular signals, temperature, lighting, humidity, device information, and network information.

14. The computer-implemented method according to claim 11, further comprising: incorporating active signaling by artificially generating digital signals to be detected by the corresponding sensors available in the enrolled devices in the system and become part of the ambient fingerprints.

15. The computer-implemented method according to claim 11, further comprising: continuously monitoring the ambient digital information being sent from all of the enrolled devices in the system to generate, match, store, update respective ambient fingerprints.

16. The computer-implemented method according to claim 15, further comprising: detecting that the ambient fingerprint does not match the stored ambient fingerprint for the authorized location; and terminating access to the remote application or service responsive to the detecting.

17. The computer-implemented method according to claim 11, further comprising: determining that the ambient information received does not match the at least a portion of the ambient finger print; and requesting confirmation that, during future verification, the authentication service compares ambient digital information received from the requesting device during the future verification to a second location currently indicated by the ambient digital information.

18. The computer-implemented method according to claim 11, further comprising: tracking movement of the authenticating entity; and terminating access to the remote application or service responsive to identifying movement of the authenticating entity that results in latest ambient fingerprint at the authenticating entity's new location not matching with any of the stored ambient fingerprints of the authorized locations.

19. The computer-implemented method of claim 11, wherein the method further comprises:

triggering a plurality of enrolled devices associated with the authenticating entity including at least an authenticating entity's mobile device to capture and communicate currently detected ambient digital information to the authentication service, responsive to any access request for the remote application or service by the authenticating entity; and incorporating such ambient digital information in generating the ambient fingerprint at the time of access;

wherein the valid comparison includes verification that the requesting device and the mobile device associated with the authenticating entity are in proximity to each other based on raw data, generated features, and machine learning models that learn the proximity measures between enrolled devices.

20. The computer-implemented method of claim 11, wherein the method further comprises: defining the authorized location to include a remote connection and respective remote location for the requesting device relative to the authorized location, establishing a pairing between the remote location and the authorized location that can be verified as part of the valid comparison.

21. At least one non-transitory computer-readable storage medium containing processor-executable instructions that, when executed, perform a method for enhanced authentication, including initial access, continuous authentication, and any subsequent access request, between an authenticating entity and a remote application or service, wherein the application or service is remote from the authenticating entity, the method comprising:

receiving ambient digital information captured from installed agents on enrolled devices, the agents configured to capture the ambient digital information which includes device information, sensor information, and network information;

updating the ambient digital information associated with respective authentication entities over time irrespective of authentication or access requests;

classifying the received and updated ambient digital information to identify information associated with respective authenticating entities, including raw data, generated features, and machine learning models;

wherein classifying includes:

generating the generated features to include associations between enrolled devices and characteristics of an ambient digital surrounding, wherein the characteristics include: information on each access request, associations between users, associations between devices, associations for users and devices, respective locations on captured information, proximity measures on captured information, inferred proximity information, co-location information derived from devices having common sensors, co-location information derived from a chain of devices without a direct communication path or common sensors;

generating the machine learning models to distinctly represent a given location in space based on at least one of the generated features or the raw data; and defining an ambient fingerprint for unique locations based on at least one of the raw data, the generated features, or the machine learning models distinct to the unique location;

responsive to receiving an access request for the remote application or service, requiring the requesting device capture of current ambient digital information;

receiving the ambient digital information;

generating an ambient fingerprint identifying a location at a time of access from at least a portion of detected digital signals present at the current location reflected by at least the requesting device;

comparing a stored ambient fingerprint for an authorized location to the ambient fingerprint generated at the time of access;

verifying that there exists at least one stored ambient fingerprint of the authorized location that shares at least a common portion of the ambient digital information at the raw data, generated features, or machine learning model space that uniquely identifies a location in space with the ambient fingerprint identifying the location at the time of access to confirm that the requesting device is in the authorized location for the authenticating entity;

permitting the access request for the remote application or service to continue responsive to the verifying and valid comparison; and limiting valid remote authentication and a continued access session to one or more authorized locations associated with one or more stored ambient fingerprints for the authenticating entity, such that valid remote authentication occurs at respective authorized locations, wherein limiting includes preventing any access from unauthorized locations and disabling and preventing any further access upon leaving the respective authorized locations until subsequent localization of the authenticating entity at any authorized location.

\* \* \* \* \*